(12) United States Patent
Shim et al.

(10) Patent No.: US 12,738,102 B2
(45) Date of Patent: Sep. 15, 2026

(54) ELECTRONIC DEVICE FOR MANAGING ENROLLED FINGERPRINTS AND METHOD FOR THE SAME

(71) Applicant: Samsung Electronics Co., Ltd., Suwon-si (KR)

(72) Inventors: Juhyoun Shim, Suwon-si (KR); Moonsoo Chang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/213,340

(22) Filed: May 20, 2025

(65) Prior Publication Data

US 2026/0045120 A1 Feb. 12, 2026

Related U.S. Application Data

(63) Continuation of application No. PCT/KR2025/006100, filed on May 7, 2025.

(30) Foreign Application Priority Data

Aug. 6, 2024 (KR) ........................ 10-2024-0104870
Oct. 10, 2024 (KR) ........................ 10-2024-0137748

(51) Int. Cl.
*G06V 40/50* (2022.01)
*G06F 21/32* (2013.01)
(Continued)

(52) U.S. Cl.
CPC .............. *G06V 40/50* (2022.01); *G06F 21/32* (2013.01); *G06V 10/82* (2022.01);
(Continued)

(58) Field of Classification Search
CPC .... G06V 40/50; G06V 10/82; G06V 40/1318; G06V 40/1365; G06V 40/40; G06F 21/32
See application file for complete search history.

(56) References Cited

U.S. PATENT DOCUMENTS 6,091,839 A 7/2000 Uchida
11,221,548 B2 1/2022 Chen
(Continued)

FOREIGN PATENT DOCUMENTS

CN 113128364 A 7/2021
CN 116798131 A 9/2023
(Continued)

OTHER PUBLICATIONS

International Search Report and written opinion dated Aug. 8, 2025, issued in International Application No. PCT/KR2025/006100.

*Primary Examiner* — Abhishek Sarma
(74) *Attorney, Agent, or Firm* — Jefferson IP Law, LLP

(57) ABSTRACT

An electronic device is provided. The electronic device includes a sensor, memory configured to store plurality of fingerprint templates, each of the plurality of fingerprint templates is an embedding vector indicating each of plurality of registered fingerprint images, and at least one computer program, and at least one processor communicatively coupled to the sensor and the memory, wherein the plurality of registered fingerprint images comprises a forged fingerprint image made by forging a fingerprint of a user, an abnormal state fingerprint image comprising an obstacle obstructing fingerprint authentication, and a normal state fingerprint image which is either a successfully registered fingerprint image or a fingerprint image matching the successfully registered fingerprint image, and wherein the at least one computer program includes instructions that, when executed by the at least one processor individually or collectively, cause the electronic device to acquire, using the sensor, an input fingerprint image indicating a fingerprint image input by the user, identify whether the input fingerprint image matches at least a part of the plurality of registered fingerprint images based on the plurality of fingerprint templates, in case that the input fingerprint image (Continued)

matches the at least a part of the plurality of registered fingerprint images, generate at least one virtual fingerprint image, based on the input fingerprint image matching the at least a part of the plurality of registered fingerprint images, store a template of the input fingerprint image and at least one template of the at least one virtual fingerprint image in the plurality of fingerprint templates, and train a fingerprint generation artificial intelligence model to generate a fingerprint image similar to the at least one virtual fingerprint image or the input fingerprint image.

18 Claims, 16 Drawing Sheets

(51) Int. Cl.

| | |
|---|---|
| ***G06V 10/82*** | (2022.01) |
| ***G06V 40/12*** | (2022.01) |
| ***G06V 40/13*** | (2022.01) |
| ***G06V 40/40*** | (2022.01) |

(52) U.S. Cl.
CPC ...... *G06V 40/1318* (2022.01); *G06V 40/1365* (2022.01); *G06V 40/40* (2022.01)

(56) References Cited

U.S. PATENT DOCUMENTS

| | | | | |
|---|---|---|---|---|
| 11,335,117 | B2 | 5/2022 | Kim et al. | |
| 11,594,068 | B2 | 2/2023 | Lee et al. | |
| 11,651,580 | B2 | 5/2023 | Lee et al. | |
| 2001/0031075 | A1 | 10/2001 | Fujii | |
| 2007/0014443 | A1 | 1/2007 | Russo | |
| 2011/0123072 | A1 | 5/2011 | Moon et al. | |
| 2015/0161432 | A1 | 6/2015 | Yoshida | |
| 2018/0137329 | A1 | 5/2018 | Kim et al. | |
| 2021/0117721 | A1* | 4/2021 | Hall | G06V 40/1376 |
| 2021/0397813 | A1* | 12/2021 | Lee | G06V 10/754 |
| 2022/0012464 | A1* | 1/2022 | Kim | G06N 3/094 |
| 2023/0118211 | A1 | 4/2023 | Lee et al. | |

FOREIGN PATENT DOCUMENTS

| | | | |
|---|---|---|---|
| KR | 10-0985775 | B1 | 10/2010 |
| KR | 10-2011-0057449 | A | 6/2011 |
| KR | 10-1087833 | B1 | 11/2011 |
| KR | 10-2020-0137450 | A | 12/2020 |
| KR | 10-2245206 | B1 | 4/2021 |
| KR | 10-2021-0129761 | A | 10/2021 |
| KR | 10-2021-0157951 | A | 12/2021 |
| KR | 10-2022-0008035 | A | 1/2022 |
| KR | 10-2022-0130804 | A | 9/2022 |

* cited by examiner

FIG. 2

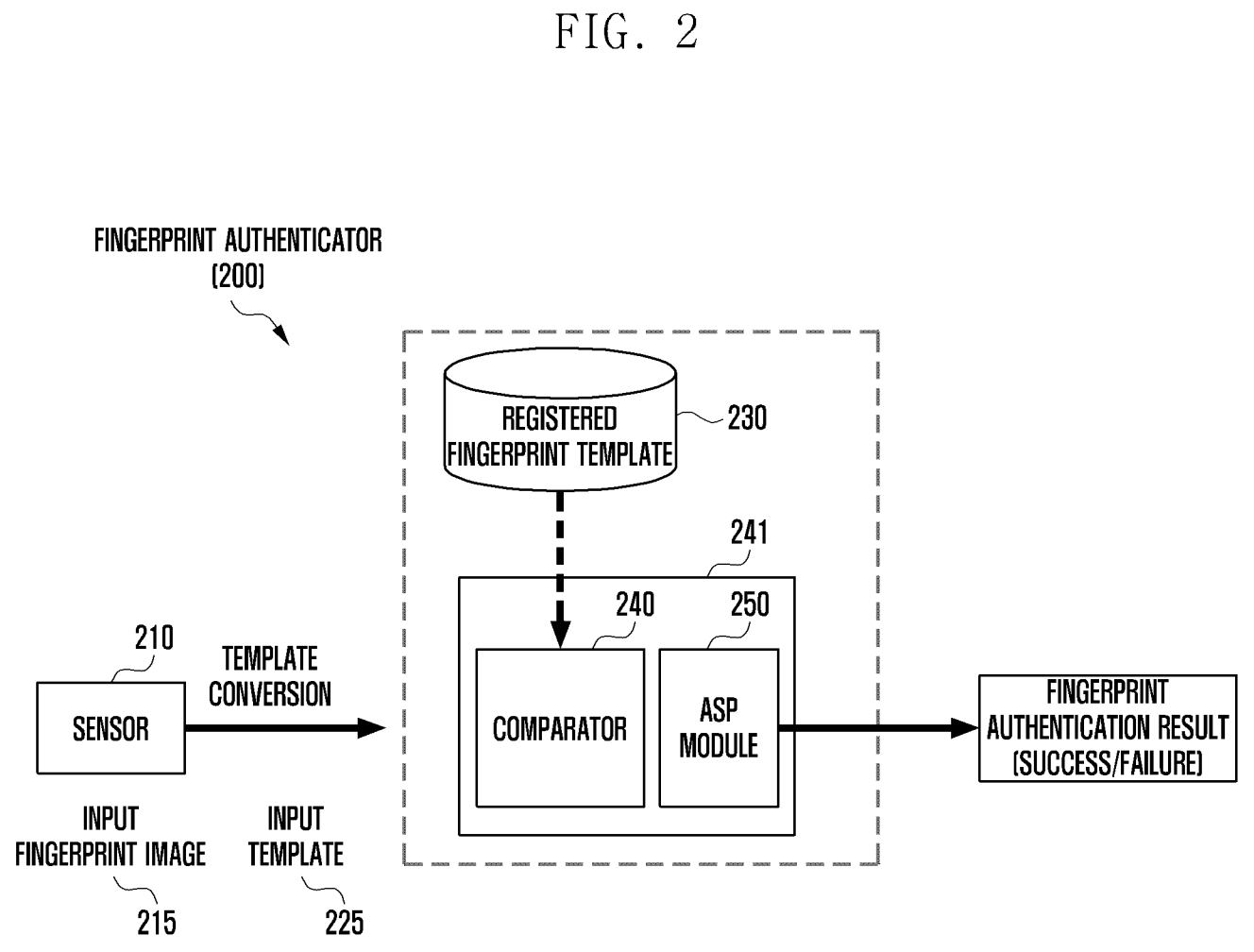

FINGERPRINT AUTHENTICATOR (200)

210 SENSOR

TEMPLATE CONVERSION

INPUT FINGERPRINT IMAGE 215

INPUT TEMPLATE 225

230 REGISTERED FINGERPRINT TEMPLATE

241

240 COMPARATOR

250 ASP MODULE

FINGERPRINT AUTHENTICATION RESULT (SUCCESS/FAILURE)

FIG. 3

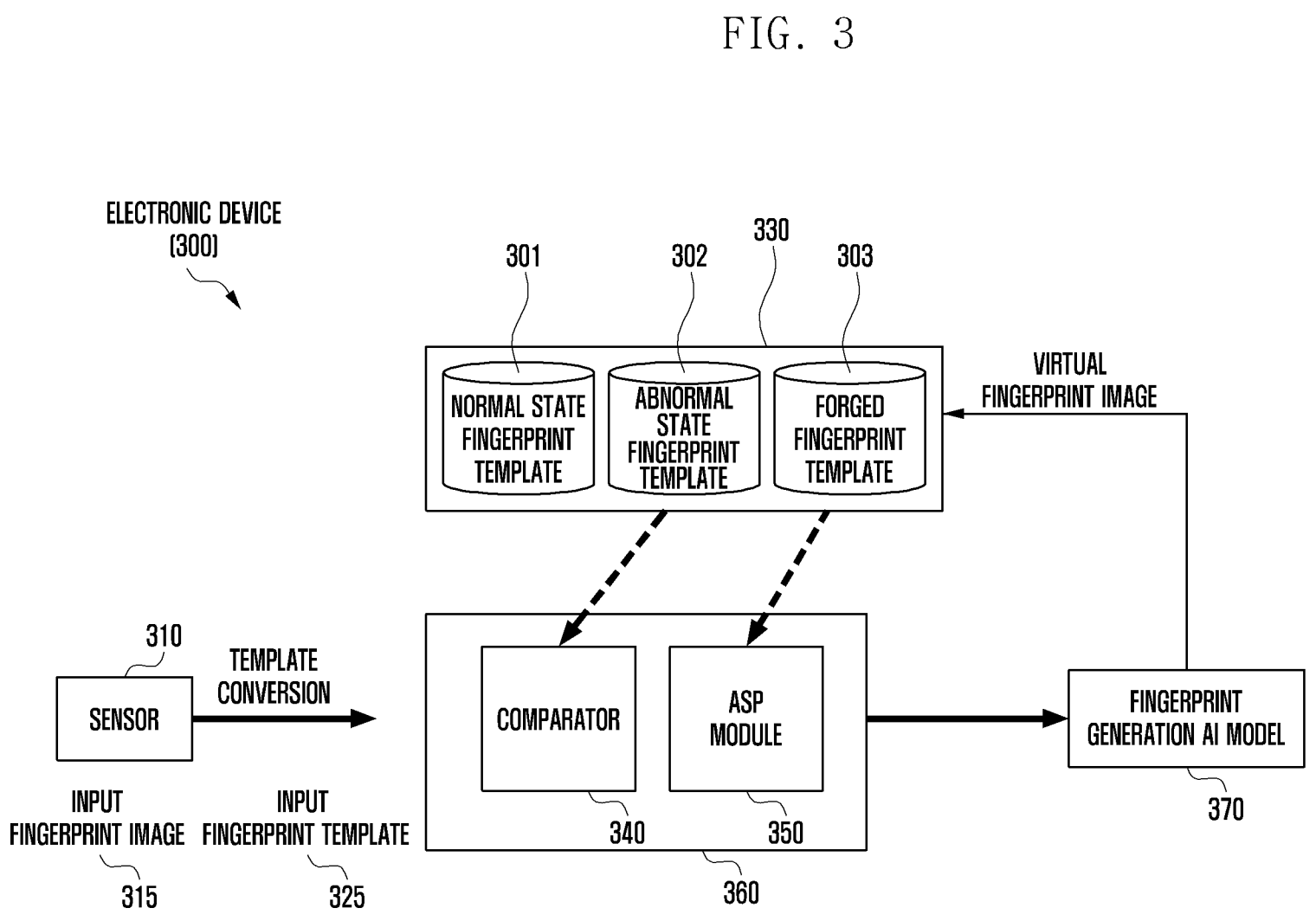

ELECTRONIC DEVICE (300)
SENSOR
310
INPUT FINGERPRINT IMAGE
315
TEMPLATE CONVERSION
INPUT FINGERPRINT TEMPLATE
325
NORMAL STATE FINGERPRINT TEMPLATE
301
ABNORMAL STATE FINGERPRINT TEMPLATE
302
FORGED FINGERPRINT TEMPLATE
303
330
COMPARATOR
340
ASP MODULE
350
360
FINGERPRINT GENERATION AI MODEL
370
VIRTUAL FINGERPRINT IMAGE

FIG. 6

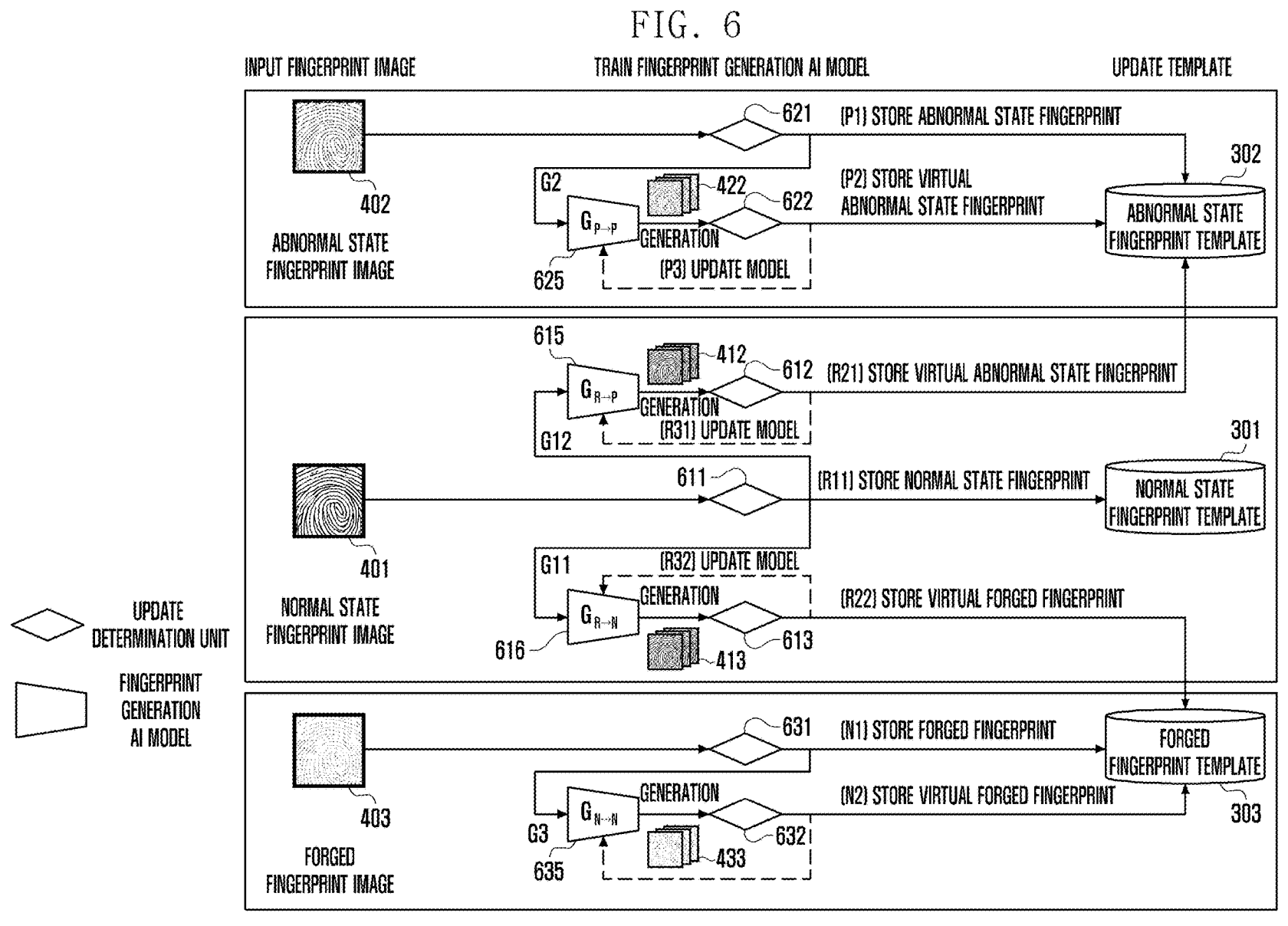

INPUT FINGERPRINT IMAGE
TRAIN FINGERPRINT GENERATION AI MODEL
UPDATE TEMPLATE

402
ABNORMAL STATE FINGERPRINT IMAGE
621
(P1) STORE ABNORMAL STATE FINGERPRINT
302
G2
422
622
(P2) STORE VIRTUAL ABNORMAL STATE FINGERPRINT
ABNORMAL STATE FINGERPRINT TEMPLATE
$G_{P \to P}$
GENERATION
(P3) UPDATE MODEL
625

615
412
612
(R21) STORE VIRTUAL ABNORMAL STATE FINGERPRINT
$G_{R \to P}$
GENERATION
(R31) UPDATE MODEL
G12
301
401
NORMAL STATE FINGERPRINT IMAGE
611
(R11) STORE NORMAL STATE FINGERPRINT
NORMAL STATE FINGERPRINT TEMPLATE
G11
(R32) UPDATE MODEL
GENERATION
(R22) STORE VIRTUAL FORGED FINGERPRINT
$G_{R \to N}$
616
613
413

403
FORGED FINGERPRINT IMAGE
631
(N1) STORE FORGED FINGERPRINT
FORGED FINGERPRINT TEMPLATE
GENERATION
(N2) STORE VIRTUAL FORGED FINGERPRINT
303
$G_{N \to N}$
G3
632
433
635

UPDATE DETERMINATION UNIT
FINGERPRINT GENERATION AI MODEL

FIG. 7

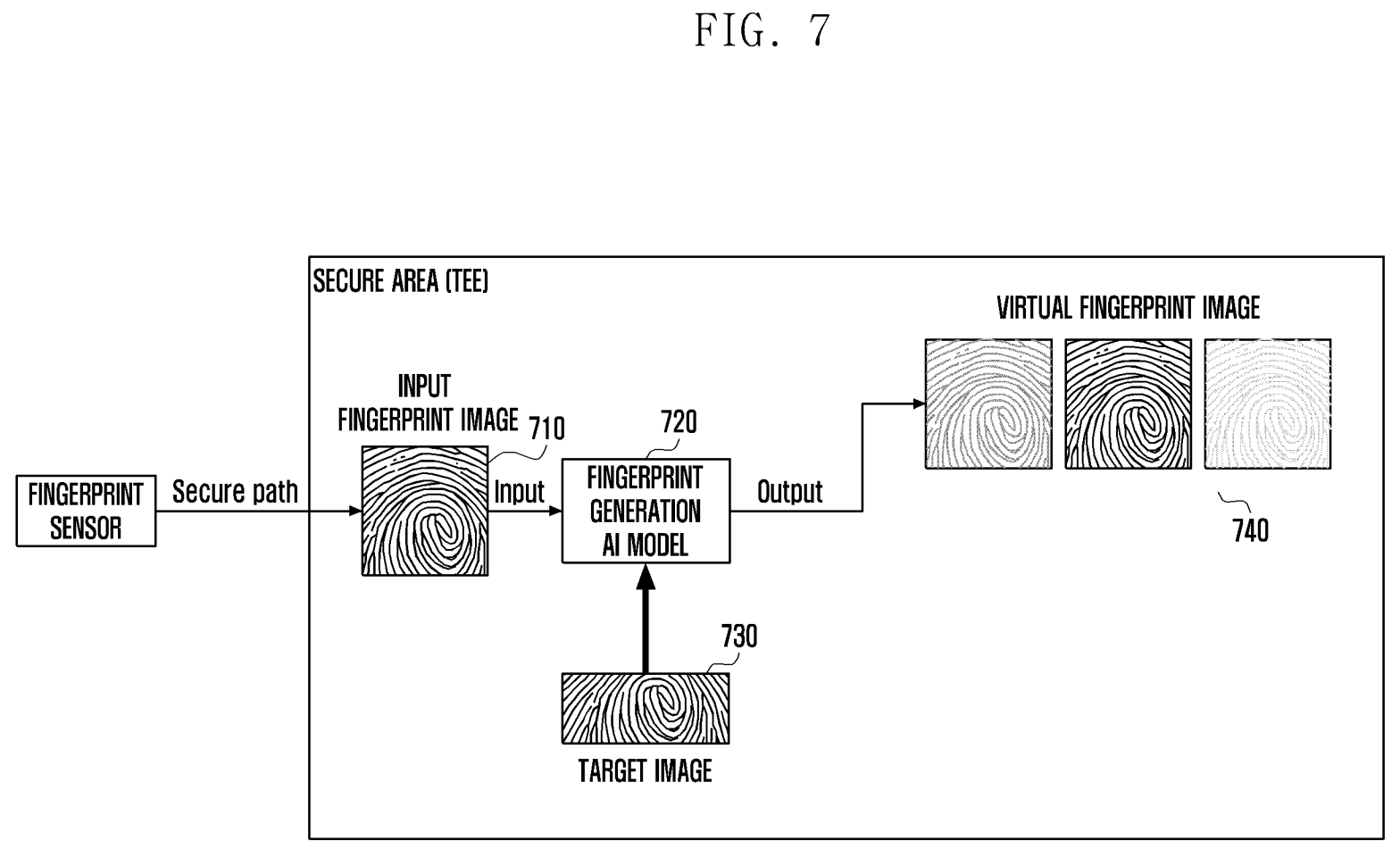

SECURE AREA (TEE)

FINGERPRINT SENSOR

Secure path

INPUT FINGERPRINT IMAGE

710

Input

720

FINGERPRINT GENERATION AI MODEL

730

TARGET IMAGE

Output

VIRTUAL FINGERPRINT IMAGE

740

ELECTRONIC DEVICE FOR MANAGING ENROLLED FINGERPRINTS AND METHOD FOR THE SAME

CROSS-REFERENCE TO RELATED APPLICATION(S)

This application is a continuation application, claiming priority under 35 U.S.C. § 365(c), of an International application No. PCT/KR2025/006100, filed on May 7, 2025, which is based on and claims the benefit of a Korean patent application number 10-2024-0104870, filed on Aug. 6, 2024, in the Korean Intellectual Property Office, and of a Korean patent application number 10-2024-0137748, filed on Oct. 10, 2024, in the Korean Intellectual Property Office, the disclosure of each of which is incorporated by reference herein in its entirety.

TECHNICAL FIELD

The disclosure relates to an electronic device and an operating method of the electronic device. More particularly, the disclosure relates to a technique for managing a registered fingerprint by the electronic device.

BACKGROUND ART

An electronic device can maintain the security of user information in the device through security authentication technologies including fingerprint authentication. Fingerprint authentication technology registers a fingerprint image through a sensor and performs fingerprint authentication on an input fingerprint image based on the registered fingerprint image. The electronic device can determine the fingerprint authentication result as successful when the input fingerprint image matches the registered fingerprint image.

The registered fingerprint image for performing fingerprint authentication may be a fingerprint image captured at the time when the user registers the fingerprint image. Unless the user newly registers their fingerprint, the registered fingerprint image may not be updated. The user's fingerprint image may partially change over time, and the registered fingerprint image may not reflect the changed user's fingerprint image.

As fingerprint authentication technology advances, the user's fingerprint image can be accurately acquired and compared with the registered fingerprint image. Although the electronic device can accurately compare the registered fingerprint image with the input fingerprint images, the accuracy of fingerprint authentication may decrease for fingerprint images that are not accurately input.

The electronic device may include an anti-spoofing-protection (ASP) module. The ASP module may include a model for distinguishing between a forged fingerprint image and a non-forged fingerprint image. The electronic device may include the same ASP module regardless of the user.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

The registered fingerprint image may be information on a fingerprint image from the past before the time of fingerprint authentication. The user's fingerprint may change over time. When the template of the registered fingerprint image is not updated, the electronic device cannot perform fingerprint authentication by reflecting the changed user's fingerprint. A fingerprint authenticator may decrease the accuracy of fingerprint authentication over time.

In a situation where a user performs fingerprint authentication, there may be an obstacle on the user's fingerprint. The input fingerprint image may be acquired unclearly depending on the obstacle. The user should input a fingerprint without an obstacle to succeed in fingerprint authentication, and the success rate of fingerprint authentication may vary depending on the obstacle in the fingerprint each time the user performs fingerprint authentication.

The ASP module may include a model that determines whether an unspecified fingerprint image is forged. Since the ASP module determines whether a fingerprint image is forged without reflecting the characteristics of the user's fingerprint image, the ASP module may incorrectly determine whether a portion of the user's fingerprint image is forged and determine the corresponding fingerprint image as a forged fingerprint image. The ASP module may determine the fingerprint authentication result as a failure by determining that the fingerprint image is the forged fingerprint image even when the user inputs the fingerprint image normally.

Aspects of the disclosure are to address at least the above-mentioned problems and/or disadvantages and to provide at least the advantages described below. Accordingly, an aspect of the disclosure is to provide a technique for managing a registered fingerprint by the electronic device.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a sensor, memory configured to store plurality of fingerprint templates, each of the plurality of fingerprint templates is an embedding vector indicating each of plurality of registered fingerprint images, and at least one computer program and at least one processor communicatively coupled to the sensor and the memory, wherein the plurality of registered fingerprint images comprises a forged fingerprint image made by forging a fingerprint of a user, an abnormal state fingerprint image comprising an obstacle obstructing fingerprint authentication, and a normal state fingerprint image which is either a successfully registered fingerprint image or a fingerprint image matching the successfully registered fingerprint image, and wherein the at least one computer program includes instructions that, when executed by the at least one processor individually or collectively, cause the electronic device to acquire, using the sensor, an input fingerprint image indicating a fingerprint image input by the user, identify whether the input fingerprint image matches at least a part of the plurality of registered fingerprint images, based on the plurality of fingerprint templates, in case that the input fingerprint image matches the at least a part of the plurality of registered fingerprint images, generate at least one virtual fingerprint image, based on the input fingerprint image matching the at least a part of the plurality of registered fingerprint images, store a template of the input fingerprint image and at least one template of the at least one virtual fingerprint image in the plurality of fingerprint templates, and train a fingerprint generation artificial intelligence model to generate a fingerprint image similar to the at least one virtual fingerprint image or the input fingerprint image.

The plurality of registered fingerprint images includes a forged fingerprint image made by forging a user's fingerprint, an abnormal state fingerprint image including an obstacle obstructing fingerprint authentication among user's fingerprints, and a normal state fingerprint image not including an obstacle among the user's fingerprints. The instructions cause, when separately or integrally executed by the at least one processor, the electronic device to acquire an input fingerprint image corresponding to a fingerprint image input by the user using the sensor. The instructions cause the electronic device to identify whether the input fingerprint image matches some of the plurality of registered fingerprint images based on the plurality of fingerprint templates. The instructions cause the electronic device, when the input fingerprint image matches some of the plurality of registered fingerprint images, to generate at least one virtual fingerprint image based on the input fingerprint image matching some of the plurality of registered fingerprint images. The instructions cause the electronic device to store a template of the input fingerprint image and a template of the at least one virtual fingerprint image in the plurality of fingerprint templates. The instructions cause the electronic device to train a fingerprint generation artificial intelligence (AI) model based on the input fingerprint image and the at least one virtual fingerprint image.

In accordance with another aspect of the disclosure, a method performed by an electronic device is provided. The method includes acquiring, using a sensor, an input fingerprint image corresponding to a fingerprint image input by a user, identifying whether the input fingerprint image matches at least a part of a plurality of registered fingerprint images, based on a plurality of fingerprint templates, embedding a vector indicating each of the plurality of registered fingerprint images, in case that the input fingerprint image matches the at least a part of the plurality of registered fingerprint images, generating at least one virtual fingerprint image, based on the input fingerprint image matching the at least a part of the plurality of registered fingerprint images, storing a template of the input fingerprint image and at least one template of the at least one virtual fingerprint image in the plurality of fingerprint templates, and training a fingerprint generation artificial intelligence model to generate a fingerprint image similar to the at least one virtual fingerprint image or the input fingerprint image.

In accordance with another aspect of the disclosure, one or more non-transitory computer-readable storage media storing one or more computer programs including computer-executable instructions that, when executed by one or more processors of an electronic device individually or collectively, cause the electronic device to perform operations are provided. The operations include acquiring, using a sensor, an input fingerprint image corresponding to a fingerprint image input by a user, identifying whether the input fingerprint image matches at least a part of plurality of registered fingerprint images, based on a plurality of fingerprint templates, embedding vector indicating each of plurality of registered fingerprint images, in case that the input fingerprint image matches the at least a part of the plurality of registered fingerprint images, generating at least one virtual fingerprint image, based on the input fingerprint image matching the at least a part of the plurality of registered fingerprint images, storing a template of the input fingerprint image and at least one template of the at least one virtual fingerprint image in the plurality of fingerprint templates, and training a fingerprint generation artificial intelligence model to generate a fingerprint image similar to the at least one virtual fingerprint image or the input fingerprint image.

Advantageous Effects of Invention

An electronic device can perform fingerprint authentication based on a result of comparing an input fingerprint image with an abnormal state fingerprint image including an obstacle and/or a forged fingerprint image as well as a normal state fingerprint image. The electronic device can accurately acquire a fingerprint authentication result by comparing the abnormal state fingerprint image with the input fingerprint, even when the input fingerprint image is a fingerprint image acquired with an obstacle or a forged fingerprint image.

The electronic device can perform fingerprint authentication based on the input fingerprint image as well as a registered fingerprint image by storing an input template in a fingerprint template database. Since the electronic device performs fingerprint authentication based on a recently input user's fingerprint image, it is possible to perform accurate fingerprint authentication even when the user's fingerprint changes over time. In addition, the electronic device can generate a virtual fingerprint image in which the structural characteristics of the input fingerprint image are maintained, and perform fingerprint authentication based on the template of the virtual fingerprint image. Since the input fingerprint image can be compared with a limited number of fingerprint images, the electronic device can perform accurate fingerprint authentication.

The electronic device can be trained to determine whether the fingerprint image is forged based on the fingerprint image of the user. Since the electronic device can generate a large number of virtual fingerprint images based on the input fingerprint image, it is possible to acquire a large number of fingerprint images of the user for training an ASP module. The ASP module trained based on a large number of fingerprint images of the user can increase the accuracy of determining whether the fingerprint image of the user is forged.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 2 is a diagram illustrating a fingerprint authenticator according to an embodiment of the disclosure;

FIG. 3 is a diagram illustrating a fingerprint authentication system of an electronic device according to an embodiment of the disclosure;

FIG. 6 is a diagram illustrating an operation of an electronic device updating a fingerprint template according to an embodiment of the disclosure;

FIG. 7 is a diagram illustrating a fingerprint generation AI model of an electronic device according to an embodiment of the disclosure;

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a wireless fidelity (Wi-Fi) chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an IC, or the like.

Hereinafter, for convenience of description, it is assumed that biometric information is a fingerprint. However, the embodiments can be equally applied to a variety of biometric information that can be recognized in the form of images, such as veins, irises, and faces.

Figure 1A:
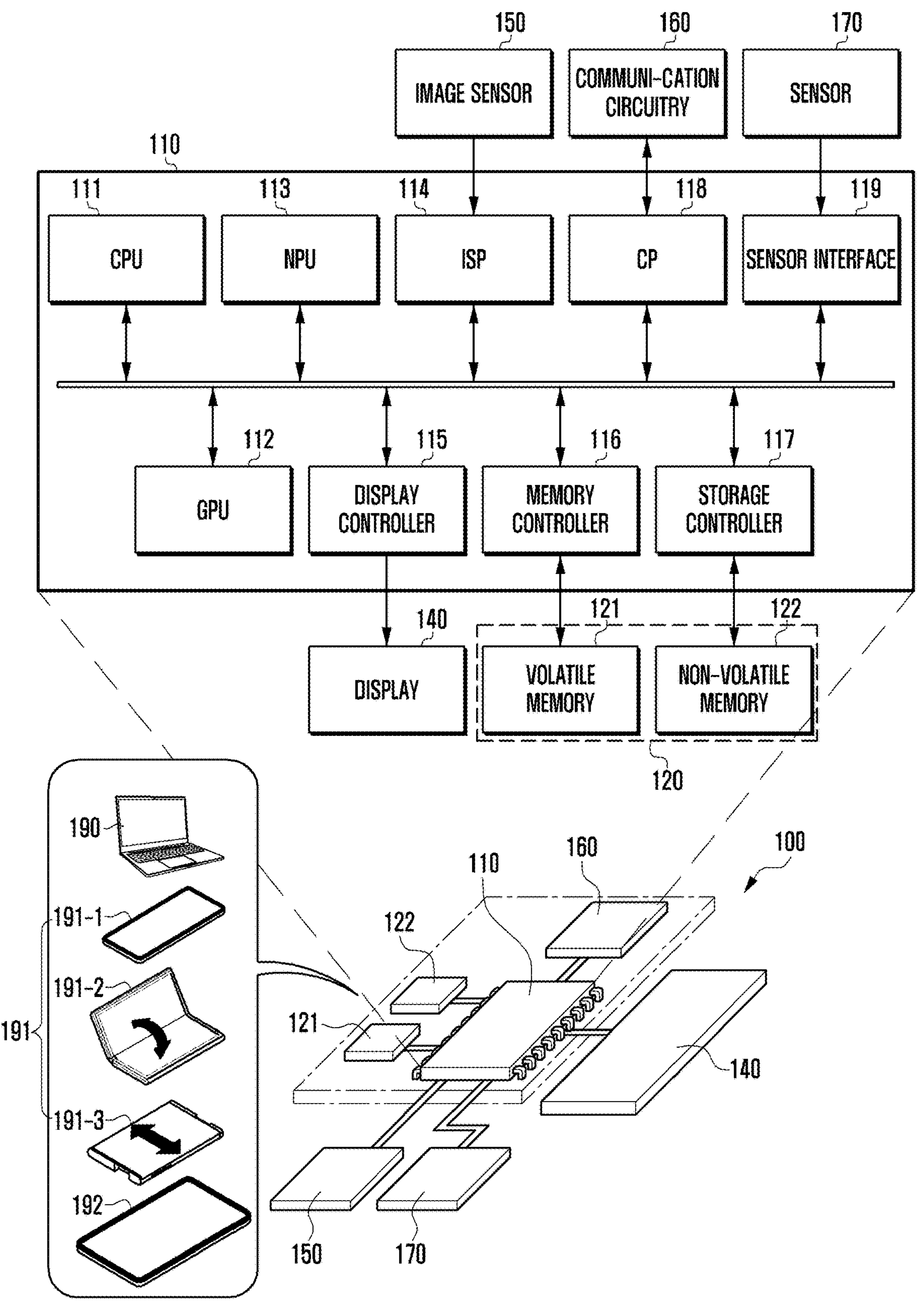
FIG. 1A is a block diagram illustrating an electronic device capable of performing the operations described in this document according to an embodiment of the disclosure.

FIG. 1A illustrates a block diagram of an electronic device 100 capable of performing the operations described herein according to an embodiment of the disclosure.

Referring to FIG. 1A, the electronic device 100 may be one of various types of electronic devices, such as a notebook computer 190, smartphones 191 having various form factors (e.g., a bar-type smartphone 191-1, a foldable smartphone 191-2, or a slidable (or rollable) smartphone 191-3), a tablet personal computer (PC) 192, a cellular telephone (not shown), and any other similar computing devices (not shown). The components illustrated in FIG. 1A, the relationships thereof, and the functions thereof are merely for illustration, and are not intended to limit the implementations described or claimed in the disclosure thereto. The electronic device 100 may be referred to as a mobile device, a user equipment, a multifunctional device, a portable device, or a server.

The electronic device 100 may comprise various components including at least one processor 110 (hereinafter, the processor 110), at least one memory 120 (hereinafter, the memory 120), at least one display 140 (hereinafter, the display 140), at least one image sensor 150 (hereinafter, the image sensor 150), at least one communication circuitry 160 (hereinafter, the communication circuitry 160), and/or at least one sensor 170 (hereinafter, the sensor 170). The aforementioned components are merely of an example. For example, the electronic device 100 may comprise other components (e.g., a power management integrated circuitry (PMIC), an audio processing circuitry, an antenna, a rechargeable battery, or an input/output interface). For example, some components may be omitted from the electronic device (100). For example, some components may be integrated into one component.

The processor 110 may be implemented as one or more integrated circuit (or circuitry) (IC) chips and may perform various data processing. The processor 110 may include at least one electrical circuitry and may process instructions (or program, data, and so on) stored in the memory 120 individually or collectively in a distributed manner. The processor 110 may include a processor assembly that includes one or more processing circuitries. The processor may include any processing circuitry that may be operative for controlling operations and performance of one or more components (e.g., the memory 120, a display 140, the image sensor 150, the communication circuitry 160, and/or the sensor 170) of the electronic device. For example, the processor 110 (e.g., an application processor (AP)) may be implemented as a system on chip (SoC) (e.g., one chip or chipset). For example, the processor 110 may be implemented as a plurality of cores (or at least one core circuitry), a plurality of chips, or a plurality of chipsets. For example, the processor 110 may comprise one or more processing circuitry. For example, the processor 110 may comprise one or more processing circuitry which are individually and/or collectively configured to perform various functions of the disclosure. As a non-limiting example, at least a portion of the processor 110 may be included in a first chip of the electronic device 100 and at least another portion of the processor 110 may be included in a second chip of the electronic device 100 different from the first chip of the electronic device 100.

For example, the processor 110 may comprise a central processing unit (CPU) 111, a graphics processing unit (GPU) 112, a neural processing unit (NPU) 113, an image signal processor (ISP) 114, a display controller 115, memory controller 116, a storage controller 117, a communication processor (CP) 118, and/or a sensor interface 119. These components of the processor 110 are merely of an example. For example, the processor 110 may further comprise other components. For example, some components of the processor 110 may be omitted from the processor 110. For example, some components of the processor 110 may be included as separate components of the electronic device 100 outside the processor 110. For example, some components of the processor 110 (e.g., the memory controller 116) may be included in other components of the electronic device 100 (e.g., at least a portion of the memory 120, an interface (e.g., usable for connecting to at least one component of the electronic device 100), the display 140, and/or the image sensor 150).

The processor 110 may cause other components of the electronic device 100 to perform various operations by executing instructions stored in the memory 120. The CPU 111 (or a central processing circuitry) may be configured to control the components of the processor 110 based on execution of instructions stored in the memory 120 (e.g., the volatile memory 121 and/or the non-volatile memory 122). The GPU 112 (or a graphic processing circuitry) may be configured to execute parallel computations (e.g., rendering). The NPU 113 (or a neural processing circuitry, or an artificial intelligence (AI) chip) may be configured to execute operations (e.g., convolution computations) for an artificial intelligence model. The ISP 114 (or an image signal processing circuitry) may be configured to process a raw image obtained from the image sensor 150 in a format suitable for a component in the electronic device 100 or a component of the processor 110. The display controller 115 (or a display control circuitry, or a display processing unit (DPU)) may be configured to process an image obtained from the CPU 111, the GPU 112, the ISP 114, or the memory 120 (e.g., the volatile memory 121) in a format suitable for the display 140. The memory controller 116 (or memory control circuitry) may be configured to control reading data from the volatile memory 121 and writing data to the volatile memory 121. The storage controller 117 (or a storage control circuitry) may be configured to control reading data from the non-volatile memory 122 and writing data to the non-volatile memory 122. The CP 118 (or a communication processing circuitry) may be configured to process data obtained from a component of the processor 110 in a format suitable for transmission to another electronic device via the communication circuitry 160, or to process data obtained from another electronic device via the communication circuitry 160 in a format suitable for processing of the component of the processor 110. For example, the communication circuitry 160 may comprise one or more communication circuitry. The sensor interface 119 (or a sensing data processing circuitry, a sensor hub) may be configured to process data on a state of the electronic device 100 and/or a state around the electronic device 100, obtained through the sensor 170, in a format suitable for a component of the processor 110.

The memory 120 may comprise one or more storage mediums (or one or more storage devices). For example, the memory 120 may include memory assembly that includes one or more storage mediums. For example, the one or more storage mediums may comprise a permanent memory (e.g., the non-volatile memory 122) such as a hard drive, a flash memory, a read-only memory (ROM), a semi-permanent memory (e.g., the volatile memory 121) such as a random access memory (RAM), a storage (or a storage assembly) of any other suitable type, or any combination thereof. The memory 120 may comprise a cache memory which is memory of one or more different types used to store data for performing a function or feature of the electronic device 100 at least temporarily. As a non-limiting example, the cache memory may be included in the processor 110. The memory 120 may be fixedly embedded within the electronic device 100, or may be incorporated onto one or more suitable types of components that may be repeatedly inserted into the electronic device 100, and removed from the electronic device 100 (e.g., a subscriber identity module (SIM) card, and/or a secure digital (SD) card).

For example, the memory 120 may store one or more software applications such as an operating system (or a system) software application, a firmware software application, a driver software application, a plug-in (e.g., add-in, add-on, and/or applet) software application, and/or any other suitable software application. For example, the one or more software applications may include instructions executable by the processor 110. For example, the memory 120 may store instructions callable by an application programming interface (API). For example, the memory 120 may store instructions in a library.

Figure 1B:
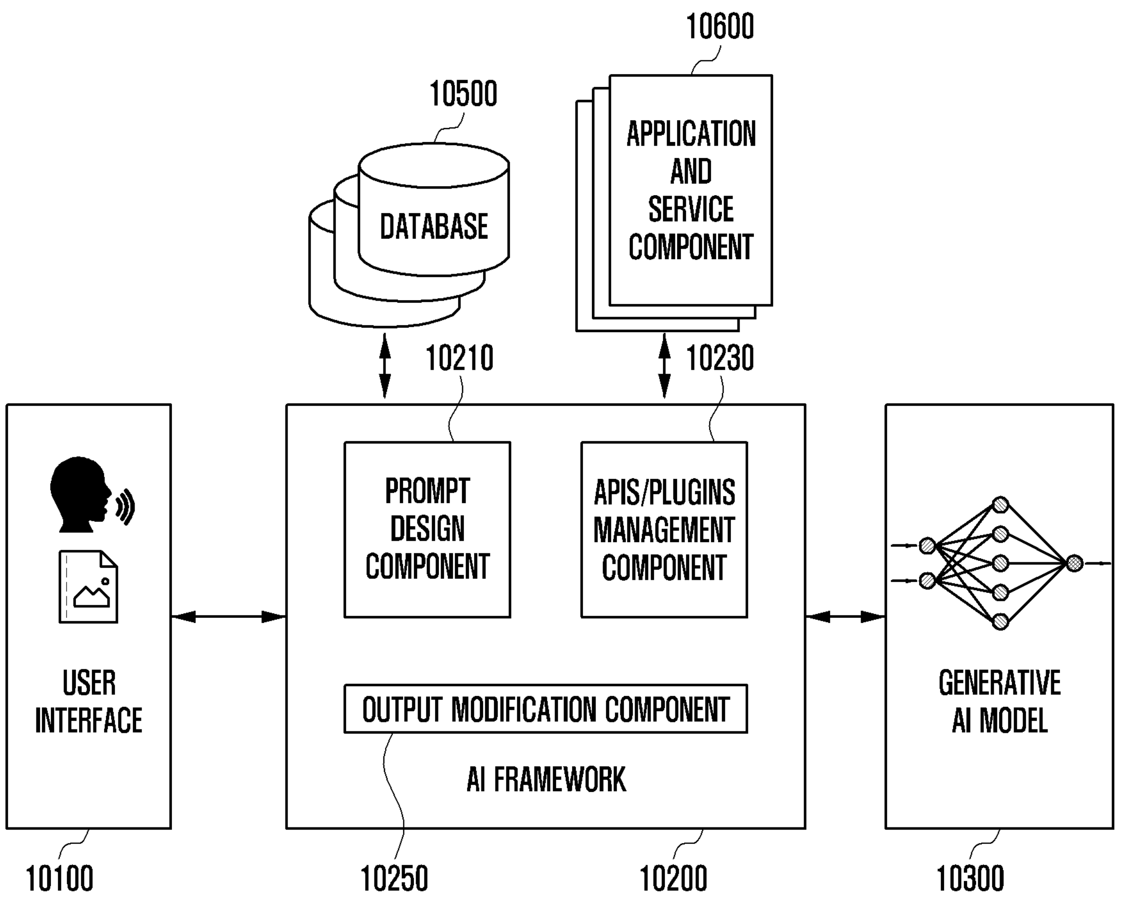
FIG. 1B is a schematic diagram illustrating an artificial intelligence (AI) system according to an embodiment of the disclosure.

FIG. 1B is a schematic diagram illustrating an artificial intelligence (AI) system according to an embodiment of the disclosure.

Referring to FIG. 1B, an AI system according to an embodiment may include a user interface 10100, a database 10500, an application and service component 10600, an AI framework 10200, and a generative AI model 10300.

The user interface 10100 may receive an input of a user query. The input may include a user input and/or data acquired or generated by an electronic device (e.g., the electronic device 100 described above, an electronic device 300 of FIG. 3, or an electronic device 1300 of FIG. 13). The data may include images and videos generated by at least one processor of the electronic device (e.g., the at least one processor 110 or the processor 1310 of FIG. 13), and/or sensor data (e.g., illuminance data surrounding the electronic device obtained from the sensor 170 or a sensor hub, posture data {or orientation data} of the electronic device, the temperature inside the electronic device {e.g., the temperature of the display 140 or the temperature of the at least one processor 110}, size information of the display area of the display 140, and/or an image acquired through the image sensor 150 of the electronic device). For example, the user query may be data in the form of natural language, touch data acquired through a touch circuit included in the display 140 (e.g., used to identify input from a finger and/or stylus), images, audio, and/or video. In addition, context information may be transmitted together at the time of the user query. The context information may include a variety of side information related to the time when the user query is input to the AI system. For example, there may be application information about an application currently being used by the user or information about the user's location. As another example, the user query may also include a non-natural language input that does not generate natural language, such as a design request or modification. In addition, the user query may also include data in a mixed form of the above-described natural language, images, sound, and context information. In addition, the user interface 10100 may output the output of the AI system to the user. The output may include a result (or result information) generated or acquired by the AI system based at least a part on the input. The output may be provided in the form of natural language or a specific content, and may also be provided in the form of an action requested by the user. For example, the output may have a format according to the user setting of the electronic device.

The AI framework 10200 may receive an input of a user query and coordinate and control each component necessary to perform the user's intention. The AI framework 10200 may include a prompt design component 10210, an application and plug-in management component (APIs/Plugins management component) 10230, and an output modification component 10250.

The user query or action input in the user interface 10100 may be transmitted to the prompt design component 10210. The prompt design component 10210 may be used to generate prompts suitable for input into a large language model (LLM), a large vision model (LVM), or a large multimodal model. The prompt design component 10210 may be an AI component that uses a machine learning algorithm or neural network to develop superior prompts over time. The prompt design component 10210 may access the database 10500 (e.g., a knowledge component) containing user preference data, a prompt library, and prompt examples to generate the prompts and transmit the generated prompts to the LLM, the LVM, and/or the large multimodal model (LMM).

The APIs/Plugins management component 10230 may perform a role of communicating with external information when there is a request for additional information when a user input is transmitted as an input to the generative AI model 10300. The APIs/Plugins management component 10230 establishes a channel that can communicate with the outside of the AI system through an application programming interface (API), thereby enabling access to various data sources. For example, the APIs/Plugins management component 10230 may be used to request corresponding information from another component (e.g., the application and service component 10600) that performs feedback (or response) according to the above prompt. The acquired information may be used to generate a prompt by the prompt design component 10210 along with the user input, or may be used as an input to the generative AI model 10300. In addition, when an action that finally performs a user query, not an intermediate result, is required to be performed by a corresponding application or service, the APIs/Plugins management component 10230 may request the action through the API. Information obtained from an external source may be transmitted as an input to the generative AI model 10300 along with the user input.

The output modification component 10250 may fine-tune (or adjust) (or change) the output of the generative AI model 10300. For example, the output modification component 10250 may determine the relevance (e.g., score) between the output (e.g., content) of the generative AI model and the user input. For example, the output modification component 10250 may verify whether the content generated through the LLM, the LVM, or the LMM contains the above-mentioned relevance, biased information (e.g., selective information), or harmful information (e.g., violent content or profanity). In addition, the output modification component 10250 may determine to how much the content matches the user's desired result and, if necessary, proceed with an additional process. In addition, the output modification component 10250 may configure hints for avoiding an unwanted output and provide the configured hints the user.

The generative AI model 10300 may generally refer to an artificial intelligence neural network that generates new types of data based on user input information. The generative AI model 10300 may include an image generation model and/or a language generation model. The image generation model may include a generative adversarial network (GAN) and/or a variational auto encoder (VAC). An example of the image generation model is a diffusion-based generative model that uses the structure of a VAE and a transformer. In addition, the language generation model is a model that is trained to output the most appropriate output value statistically based on an input value, and representative examples thereof include models such as CHAT-GPT 3 and CHAT-GPT 4. In addition, the language generation model may include an LMM that can recognize various types of data inputs such as text, images, and voices and generate new data corresponding thereto.

In an embodiment, the AI framework 10200 and/or the generative AI model 10300 may be included in an AI module (e.g., including a processing circuit) within the electronic device. For example, the AI module may be operatively coupled with at least one processor (e.g., at least one processor 110 or processor 1310) of the electronic device. For example, the AI module may be operatively coupled with a sensor hub of the electronic device for one or more sensors within the electronic device.

FIG. 2 is a diagram illustrating a fingerprint authenticator according to an embodiment of the disclosure.

A fingerprint authenticator 200 may be an example of an electronic device that manages a user's registered fingerprint. The fingerprint authenticator 200 may perform fingerprint authentication by comparing a user's registered fingerprint image with an input fingerprint image 215 input through a sensor 210. The fingerprint authenticator 200 may perform fingerprint authentication by identifying whether the input fingerprint image 215 matches the registered fingerprint image and identifying whether the input fingerprint image 215 is forged. For example, the fingerprint authenticator 200 may include a fingerprint authentication unit 241 including a comparator 240 that identifies whether the input fingerprint image 215 matches the registered fingerprint image, and an anti-spoofing-protection (ASP) module 250 that identifies whether the input fingerprint image 215 is forged.

The fingerprint authenticator 200 may store a registered fingerprint template 230 that converts a user's registered fingerprint image into an embedding vector, and compare the stored registered fingerprint template 230 with an input template 225 that converts a user's input fingerprint image into an embedding vector. The registered fingerprint template 230 is a fingerprint template corresponding to a registered fingerprint image at the time when the user registers the fingerprint image, and may be information about the fingerprint image from the past before the time of fingerprint authentication. Since the user's fingerprint may change over time, when the registered fingerprint template 230 is not updated, the fingerprint authenticator 200 cannot perform fingerprint authentication by reflecting the changed user's fingerprint. In the fingerprint authenticator 200, the accuracy of fingerprint authentication may decrease over time.

In a situation where a user performs fingerprint authentication, there may be an obstacle on the user's fingerprint. The input fingerprint image 215 may be acquired unclearly due to the obstacle. The fingerprint authenticator 200 may store the registered fingerprint template 230 including the template of the registered fingerprint image which is input and stored at the time of fingerprint registration, and the template of the fingerprint image that has succeeded in fingerprint authentication. The fingerprint authenticator 200 may store a fingerprint whose fingerprint recognition rate is greater than or equal to a threshold value as the registered fingerprint template 230, and may store the template of the fingerprint image that matches the registered fingerprint image as the registered fingerprint template 230. The fingerprint images that are compared with the fingerprint images input by the fingerprint authenticator 200 for fingerprint authentication may be fingerprint images that have been successfully registered and fingerprint images that match the registered fingerprint images during authentication. Since the fingerprint authenticator 200 does not separately store the user's fingerprint image including an obstacle (e.g., wet fingerprint image or dry fingerprint image), fingerprint authentication cannot be performed based on the fingerprint image including the obstacle. The fingerprint authenticator 200 may determine the fingerprint authentication result for the input fingerprint image 215 due to the obstacle as a failure. Since the user may succeed in fingerprint authentication only by inputting a fingerprint image without the obstacle, the user may experience the inconvenience of having to identify and/or remove the obstacle existing in the fingerprint for each situation in which fingerprint authentication is performed.

The fingerprint authenticator may include an ASP module 250. The ASP module 250 may be a model that distinguishes between a forged fingerprint image and a non-forged fingerprint image. The ASP module 250 may be a model that determines whether the fingerprint image of an unspecified person is forged. Since the ASP module determines whether a fingerprint image is forged without reflecting the characteristics of the user's fingerprint image, the ASP module may incorrectly determine whether a portion of the user's fingerprint image is forged and determine the corresponding fingerprint image as a forged fingerprint image. The ASP module 250 may determine the fingerprint authentication result as a failure by determining that the fingerprint image is the forged fingerprint image even when the user inputs the fingerprint image normally.

Hereinafter, with reference to FIGS. 3, 4A, 4B, and 5 to 14, a method of managing registered fingerprints by an electronic device 300 to solve the above problem will be described.

FIG. 3 is a diagram illustrating a fingerprint authentication system of an electronic device according to an embodiment of the disclosure.

The electronic device 300 may include a sensor 310 that detects a user's fingerprint (e.g., the sensor 170 of FIG. 1A). The electronic device 300 may acquire an input fingerprint image 315 in which a user's fingerprint appears through the sensor 310. The electronic device 300 may convert the input fingerprint image 315 acquired by the sensor 310 into an embedding vector to acquire an input fingerprint template 325. The electronic device 300 may compare the input fingerprint template 325 with a template of a registered fingerprint image of the user. The template may refer to a form of storing data obtained by extracting minutiae of the fingerprint image in memory. The template may be data in the form of a numerical value (or character) corresponding to the minutiae of the fingerprint image. For example, the electronic device (e.g., the electronic device 100 of FIG. 1A) may include, as the minutiae, minutiae such as ridge ending points, bifurcation points, or ridge-patterned areas of the input fingerprint image 315. For example, the electronic device may identify the directionality of a fingerprint by finding a core and a delta, which are the central points of the fingerprint, as the minutiae, or may identify the shape of the fingerprint (e.g., the shape of ridge ending points, a bifurcated shape, an isolated shape, a connected shape).

Figure 13:
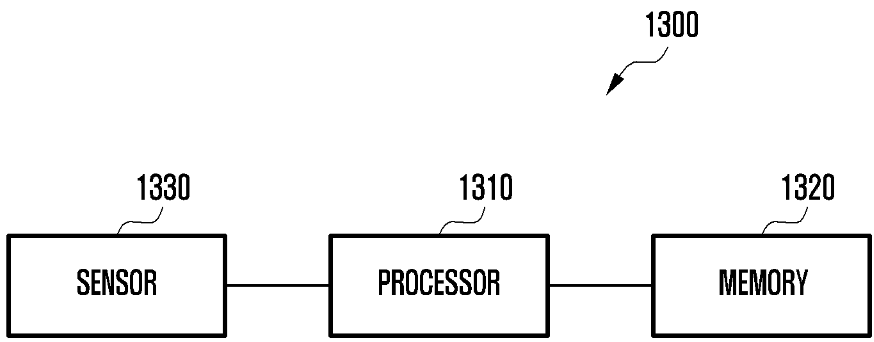
FIG. 13 is a block diagram illustrating an electronic device according to an embodiment of the disclosure.

The template may be converted from the fingerprint image by a processor (e.g., processor 1310 of FIG. 13) included in the electronic device 300 (e.g., the electronic device 1300 of FIG. 13).

The fingerprint template database 330 may be a database that stores user's fingerprint templates. The fingerprint template database 330 may store the template of the fingerprint image recognized as the user's fingerprint. The fingerprint template database 330 may not store a fingerprint image that is not recognized as the user's fingerprint. For example, the fingerprint template database 330 may store the template of the user's fingerprint image input at the time of fingerprint registration or fingerprint authentication. The fingerprint template database 330 may store a fingerprint template including a template of a fingerprint image which is input and stored at the time of fingerprint registration, and a template of a fingerprint image that has succeeded in fingerprint authentication. The fingerprint template database 330 may store the template of the fingerprint whose fingerprint recognition rate is greater than or equal to a threshold value, and may store the template of the fingerprint image that matches the template of a stored fingerprint image as the registered fingerprint template.

The electronic device 300 may store the fingerprint image whose recognition rate is greater than or equal to the threshold value as the registered fingerprint image during the fingerprint registration process, and may not store the fingerprint image whose recognition rate is lower than the threshold value. For example, a wet fingerprint may have a lower recognition rate of an image recognized by the sensor 310 compared to a dry fingerprint. When the wet fingerprint image is input, the electronic device 300 may determine that the fingerprint registration has failed because the recognition rate is lower than the threshold value, and may not store the corresponding fingerprint image in the fingerprint template database 330.

The fingerprint template database 330 may be stored in memory (e.g., memory 1320 of FIG. 13) included in the electronic device 300 (e.g., an electronic device 1300 of FIG. 13). The fingerprint template database 330 may include a normal state fingerprint template 301, an abnormal state fingerprint template 302, and a forged fingerprint template 303. A fingerprint image recognized as the user's fingerprint may be classified into one of the normal state fingerprint template 301, the abnormal state fingerprint template 302, and the forged fingerprint template 303, and stored in the fingerprint template database 330. The operation of the electronic device 300 classifying the fingerprint images will be described in FIG. 4A.

The normal state fingerprint template 301 may refer to a fingerprint template that is converted from the normal state fingerprint image among fingerprint images. The normal state fingerprint image may refer to a normal state fingerprint image acquired by the sensor 310. The normal state may refer to the state of a fingerprint that has succeeded in fingerprint registration and a fingerprint that matches (or coincides with) a registered fingerprint. For example, the normal state may refer to a state of a fingerprint whose recognition rate of the fingerprint image is greater than or equal to a threshold value.

Some of the fingerprint images input through the sensor may be fingerprint images that include obstacles. The fingerprint images input through the sensor may be modified so that the fingerprint images input through the sensor do not match the registered fingerprint images (or the fingerprint images that were authenticated by matching the registered fingerprint images). The obstacles may include any external factors (e.g., moisture) that obstruct the recognition of the user's fingerprint. The obstacles may include not only external factors but also factors (e.g., scratches or dryness) that occur on the user's fingerprint that obstructs the recognition of the fingerprint.

The abnormal state fingerprint template 302 may refer to a fingerprint template that is converted from an abnormal state fingerprint image among fingerprint images. The abnormal state may refer to a state in which an obstacle exists in the fingerprint of a user performing fingerprint authentication. The abnormal state fingerprint image may be recognized differently from the registered fingerprint image (or the fingerprint image that matches (or coincides with) the registered fingerprint image) due to an obstacle that obstructs fingerprint recognition (e.g., an external element or an element that obstructs fingerprint recognition occurring on the fingerprint).

The abnormal state fingerprint image may be a fingerprint image of a user recognized by the sensor 310 in a state where there is an obstacle. For example, the abnormal state fingerprint image may include a fingerprint image input in a state where the user's fingerprint is wet, dry, or injured.

According to an embodiment, the abnormal state fingerprint template 302 may include a template of an abnormal state fingerprint image of a user performing fingerprint authentication, a virtual abnormal state fingerprint image generated based on the abnormal state fingerprint image, and an abnormal state fingerprint image generated based on the normal state fingerprint image input during fingerprint registration (or fingerprint authentication).

The forged fingerprint template 303 may refer to a fingerprint template that is converted from a forged fingerprint image. A forged fingerprint may refer to a fingerprint input by an object other than the user's finger among fingerprint images recognized as the user's fingerprint. The fingerprint template database 330 may store the fingerprint image recognized as the user's fingerprint, and the forged fingerprint image may be a template of a fingerprint image recognized as the user's fingerprint, although the forged fingerprint image is not the user's fingerprint image. For example, the forged fingerprint image may include an image made by forging a fingerprint image that matches the user's fingerprint using a material including gelatin, clay, wood, and silicon.

According to an embodiment, the forged fingerprint template 303 may include templates of a forged fingerprint image for performing fingerprint authentication, a virtual forged fingerprint image generated based on the forged fingerprint image, and a forged fingerprint image generated based on a normal state fingerprint image input during fingerprint registration (or fingerprint authentication).

The comparator 340 may output a comparison value, which is a value indicating the similarity between two templates based on two templates. For example, the comparator 340 may compare the input fingerprint template 325 of the input fingerprint image 315 input through the sensor 310 with the fingerprint templates 301, 302, and 303 included in the fingerprint template database 330, and output a comparison value indicating the similarity between the compared templates.

The anti-spoofing-protection (ASP) module 350 may identify whether a fingerprint image is forged. For example, the ASP module 350 may identify whether the input fingerprint image 315 input through the sensor 310 is a forged fingerprint. The ASP module 350 according to an embodiment may include an artificial intelligence (AI) model. The AI model included in the ASP module 350 may be trained to determine whether the user's fingerprint image is forged based on the user's fingerprint image.

The fingerprint authentication unit 360 may determine whether fingerprint authentication succeeds using the comparator 340 and the ASP module 350. The fingerprint authentication unit 360 may determine whether fingerprint authentication succeeds based on the comparison value output from the comparator 340 and a threshold value indicating whether fingerprint authentication succeeds.

The fingerprint authentication unit 360 may classify the input fingerprint image 315 into one of the normal state fingerprint image, the abnormal state fingerprint image, and the forged fingerprint image based on the comparison value output from the comparator 340 and the threshold value indicating whether fingerprint authentication succeeds. The threshold value may be a value indicating that the fingerprint templates corresponding to the comparison value are fingerprints of the same person.

A fingerprint generation AI model 370 may generate a virtual fingerprint image similar to the fingerprint image based on the fingerprint image. For example, the fingerprint generation AI model 370 may generate at least one virtual fingerprint image by receiving the input fingerprint image 315. The virtual fingerprint image may be generated to represent the fingerprint image of the same person as the input fingerprint image 315. The fingerprint generation AI model 370 may generate a virtual fingerprint image having a shape similar to a target image based on the target image. The fingerprint generation AI model 370 may generate a virtual abnormal state fingerprint image and a virtual forged fingerprint image based on the input fingerprint image 315 when the input fingerprint image 315 is the normal state fingerprint image. The fingerprint generation AI model 370 may generate a virtual abnormal state fingerprint image based on the input fingerprint image 315 when the input fingerprint image 315 is the abnormal state fingerprint image. The fingerprint generation AI model 370 may generate a virtual forged fingerprint image based on the input fingerprint image 315 when the input fingerprint image 315 is the forged fingerprint image. The template of the generated virtual fingerprint image may be stored in the fingerprint template database 330.

Figure 4A:
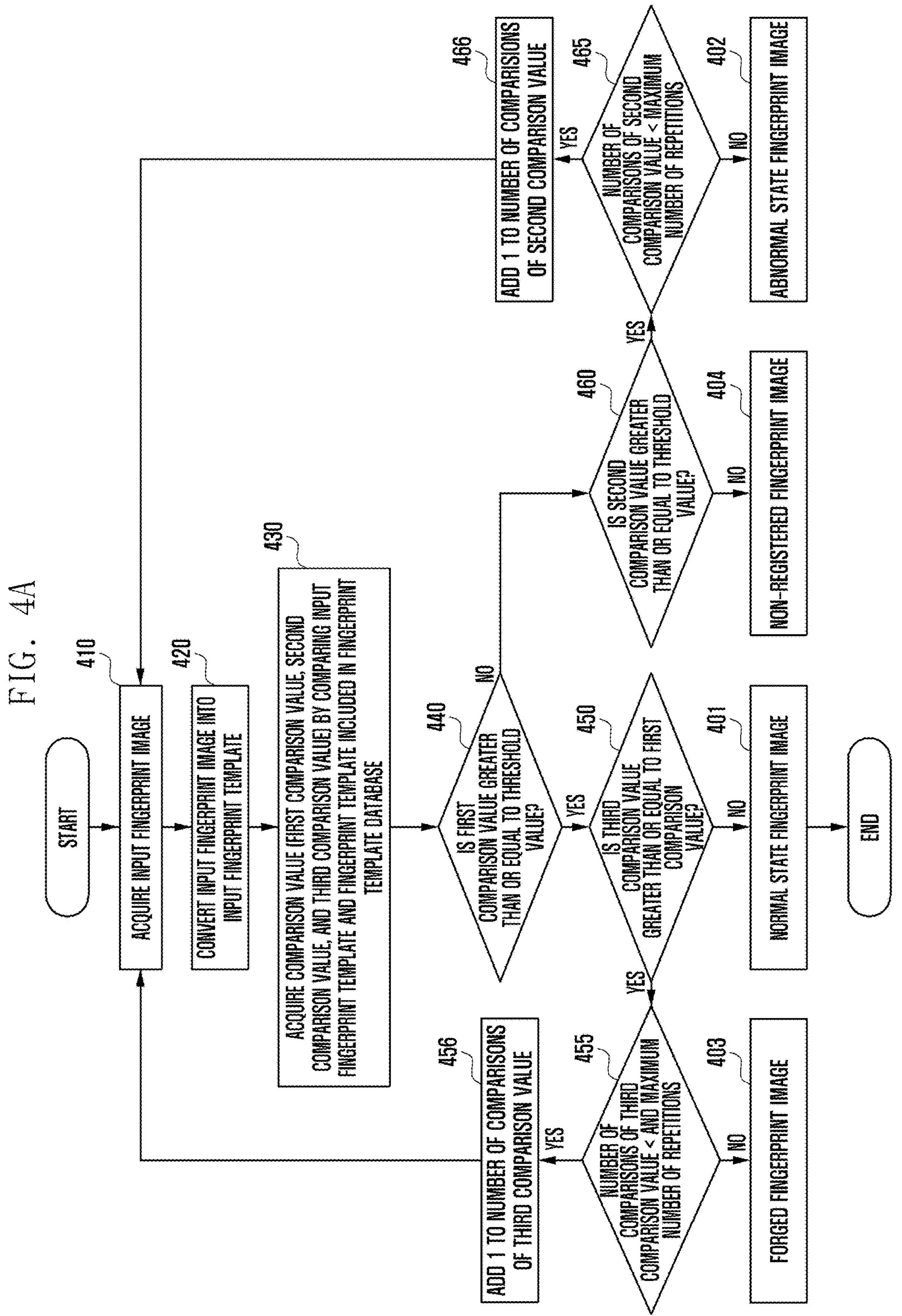
FIG. 4A is a flowchart illustrating an operation of an electronic device classifying input fingerprint images according to an embodiment of the disclosure.

FIG. 4A is a flowchart illustrating an operation of an electronic device classifying input fingerprint images according to an embodiment of the disclosure.

In operation 410, the electronic device 300 may acquire the input fingerprint image 315.

The electronic device 300 may acquire the input fingerprint image 315 corresponding to a user's fingerprint by using the sensor 310 included in the electronic device 300.

In operation 420, the electronic device 300 may convert the input fingerprint image 315 into the input fingerprint template 325, which is an embedding vector.

The template may refer to text data obtained by extracting minutiae of the fingerprint image. The template may be provided in a form that can verify the similarity between distinguished fingerprint images.

In operation 430, the electronic device 300 may acquire a comparison value by comparing the input fingerprint template 325 and the fingerprint templates (e.g., the fingerprint templates 301, 302, and 303 of FIG. 3) included in the fingerprint template database 330.

The fingerprint templates (e.g., the fingerprint templates 301, 302, and 303 of FIG. 3) included in the fingerprint template database 330 may refer to the normal state fingerprint template 301, the abnormal state fingerprint template 302, and the forged fingerprint template 303. The comparison values (e.g., first comparison value, second comparison value, and third comparison value) may refer to values indicating the similarity between two templates. For example, the comparison values (e.g., first comparison value, second comparison value, and third comparison value) may be set to have a higher value as the similarity between two templates increases. The comparison values (e.g., first comparison value, second comparison value, and third comparison value) may be set to have a lower value as the similarity between two templates decreases.

The electronic device 300 may acquire the first comparison value by comparing the input fingerprint template 325 and the normal state fingerprint template 301. The electronic device 300 may acquire the second comparison value by comparing the input fingerprint template 325 of the input fingerprint image 315 with the abnormal state fingerprint template 302. The electronic device 300 may acquire the third comparison value by comparing the input fingerprint template 325 of the input fingerprint image 315 with the forged fingerprint template 303. The fingerprint template database 330 may include a plurality of fingerprint templates, and there may be a plurality of fingerprint templates compared with the input fingerprint template 325 of the input fingerprint image 315 to acquire the comparison values (e.g., the first comparison value, the second comparison value, and the third comparison value).

The electronic device 300 may acquire the comparison values (e.g., the first comparison value, the second comparison value, and the third comparison value) based on the result of classifying (or scoring) the fingerprint templates included in the normal state fingerprint template. For example, the electronic device 300 may perform matching between fingerprint templates included in the normal state fingerprint template 301. Matching may refer to the comparison value between the fingerprint templates that exceeds a threshold value. The electronic device 300 may classify (or score) the fingerprint templates included in the normal state fingerprint template 301 in descending order starting from the highest number of successful matchings. For example, the electronic device 300 may set the fingerprint template with the highest number of successful matchings as the first normal state fingerprint template, and set the fingerprint template with the middle number of successful matchings among the fingerprint templates as an average normal state fingerprint template. The electronic device 300, when performing fingerprint authentication, may acquire the first comparison value by comparing the first normal state fingerprint template with the input fingerprint template 325. The electronic device 300, when performing fingerprint authentication, may acquire the first comparison value by comparing the average normal state fingerprint template with the input fingerprint template 325. The electronic device 300 may perform fingerprint authentication based on the fingerprint template that satisfies a predetermined condition among the fingerprint templates included in the normal state fingerprint template 301 as well as the first normal state fingerprint template and the average normal state fingerprint template. The electronic device 300 may also perform the above operation with respect to the abnormal state fingerprint template 302 and the forged fingerprint template 303, and a duplicate description will be omitted.

The electronic device 300 may store the template of the input fingerprint image 315 and the template of the virtual fingerprint image generated based on the input fingerprint image in the fingerprint template database 330 when the input fingerprint image 315 succeeds in fingerprint authentication. When the input fingerprint template 325 is stored in the fingerprint template database 330, the electronic device 300 may perform matching between the fingerprint templates to reclassify (or score) the fingerprint templates. The first comparison value may be a value indicating the similarity between the input fingerprint image 315 and the user's normal state fingerprint image 401. The higher the first comparison value, the more similar the input fingerprint image 315 and the user's normal state fingerprint image 401 may be. The second comparison value may be a value indicating the similarity between the input fingerprint image 315 and the user's abnormal state fingerprint image 402. The higher the second comparison value, the more similar the input fingerprint image 315 and the user's abnormal state fingerprint image 402 may be. The third comparison value may be a value indicating the similarity between the input fingerprint image 315 and the user's forged state fingerprint image. The higher the third comparison value, the more similar the input fingerprint image 315 and the user's forged fingerprint image 403 may be.

In operation 440, the electronic device 300 may determine whether the first comparison value is greater than or equal to a threshold value. The threshold value may be a value indicating that two fingerprint images corresponding to the comparison value are fingerprints of the same person. When the first comparison value is greater than or equal to the threshold value, the electronic device 300 may recognize the input fingerprint image 315 as the fingerprint image of the same person as the user of the normal state fingerprint image 401. When the first comparison value is greater than or equal to the threshold value, the electronic device 300 may determine that the input fingerprint image 315 coincides with the normal state fingerprint image 401.

In operation 450, the electronic device 300 may determine whether the third comparison value is greater than or equal to the first comparison value in response to the fact that the first comparison value is greater than or equal to the threshold value.

The electronic device 300 may determine the input fingerprint image 315 as the normal state fingerprint image 401 in response to that fact that the first comparison value is greater than or equal to the threshold value and the third comparison value is less than the first comparison value. The electronic device 300 may recognize that the input fingerprint image 315 does not match the forged fingerprint image 403 in response to the fact that the third comparison value is less than the first comparison value. The electronic device 300 may determine the input fingerprint image that matches the user's fingerprint image of the normal state fingerprint image 401 and does not match the forged fingerprint image 403, as the normal state fingerprint image 401. However, the operation of the electronic device 300 comparing the third comparison value with the first comparison value is only an example of an operation of identifying whether the forged fingerprint image 403 and the input fingerprint image 315 do not match. According to an embodiment, the electronic device may replace the operation 450 with an operation of identifying whether the third comparison value is greater than or equal to the threshold value in response to the fact that the first comparison value is greater than or equal to the threshold value.

In operation 455, the electronic device 300 may determine whether the number of comparisons between the third comparison value and the first comparison value exceeds the maximum number of repetitions in response to that fact that the first comparison value is greater than or equal to the threshold value and the third comparison value is greater than or equal to the first comparison value.

The electronic device 300 may recognize that the input fingerprint image 315 matches the user's forged fingerprint image 403 in response to the fact that the third comparison value is greater than or equal to the first comparison value. When the number of comparisons of the third comparison value and the first comparison value exceeds the maximum number of repetitions, the electronic device 300 may determine the input fingerprint image 315 as a forged fingerprint. When the number of comparisons of the third comparison value and the first comparison value does not exceed the maximum number of repetitions, the electronic device 300 may add 1 to the number of comparisons (the number of comparisons of the third comparison value and the first comparison value) in operation 456, and perform the operation of classifying the input fingerprint image 315 again from operation 410.

In operation 460, the electronic device 300 may determine whether the second comparison value is greater than or equal to the threshold value in response to the fact that the first comparison value is less than the threshold value.

The electronic device 300 may determine the input fingerprint image 315 as an unregistered fingerprint image 404 in response to the fact that the first comparison value is less than the threshold value and the second comparison value is less than the threshold value. The unregistered fingerprint image 404 is a fingerprint image that is not registered in the electronic device 300 and may refer to a fingerprint image other than the user's fingerprint. The electronic device 300 may recognize that the input fingerprint image 315 does not match the user's abnormal state fingerprint image 402 in response to the fact that the second comparison value is less than the threshold value. The electronic device 300 may determine the input fingerprint image that does not match the user's fingerprint image of the normal state fingerprint image 401 and does not match the abnormal state fingerprint image 402, as the unregistered fingerprint image 404.

In operation 465, the electronic device 300 may determine whether the number of comparisons between the second comparison value and the threshold value exceeds the maximum number of repetitions in response to the fact that the first comparison value is less than the threshold value and the second comparison value is greater than or equal to the threshold value. The maximum number of repetitions in operation 465 may be a value that is distinct from the maximum number of repetitions in operation 455.

The electronic device 300 may recognize that the input fingerprint image 315 matches the user's abnormal state fingerprint image 402 in response to the fact that the second comparison value is greater than or equal to the threshold value. When the number of comparisons of the second comparison value and the threshold value exceeds the maximum number of repetitions, the electronic device 300 may determine the input fingerprint image 315 as an abnormal state fingerprint. When the number of comparisons of the second comparison value and the threshold value does not exceed the maximum number of repetitions, the electronic device 300 may add 1 to the number of comparisons (the number of comparisons of the second comparison value and the threshold value) in operation 466, and perform the operation of classifying the input fingerprint image 315 again from operation 410.

The above-described method is only a method for the electronic device 300 to classify the input fingerprint image according to an embodiment, and the electronic device 300 may classify the input fingerprint images based on various methods. The electronic device 300 may classify the input fingerprint images into the unregistered fingerprint image 404, the normal state fingerprint image 401, the abnormal state fingerprint image 402, and the forged fingerprint image 403 based on the first comparison value, the second comparison value, and the third comparison value.

According to an embodiment, the electronic device 300 may classify the input fingerprint image 315 according to the above-described operation of FIG. 4A, and determine the fingerprint authentication result according to the classification result. The electronic device 300 may determine the fingerprint authentication as failed when the input fingerprint image 315 is the unregistered fingerprint image 404 or the forged fingerprint image 403. The electronic device 300 may determine the fingerprint authentication as successful when the input fingerprint image 315 is either the normal state fingerprint image 401 or the abnormal state fingerprint image 402.

The electronic device 300 may perform fingerprint authentication based on the results of comparing the input fingerprint image 315 with the normal state fingerprint image 401, the abnormal state fingerprint image 402, and the forted fingerprint image 403. The electronic device 300 may accurately acquire the fingerprint authentication result even when the input fingerprint image 315 is a fingerprint image acquired with an obstacle, by comparing the abnormal state fingerprint image 402 with the input fingerprint image 315. The electronic device 300 may accurately acquire the fingerprint authentication result even when the input fingerprint image 315 is the forged fingerprint image 403 by comparing the forged fingerprint image 403 and the input fingerprint image 315.

Figure 4B:
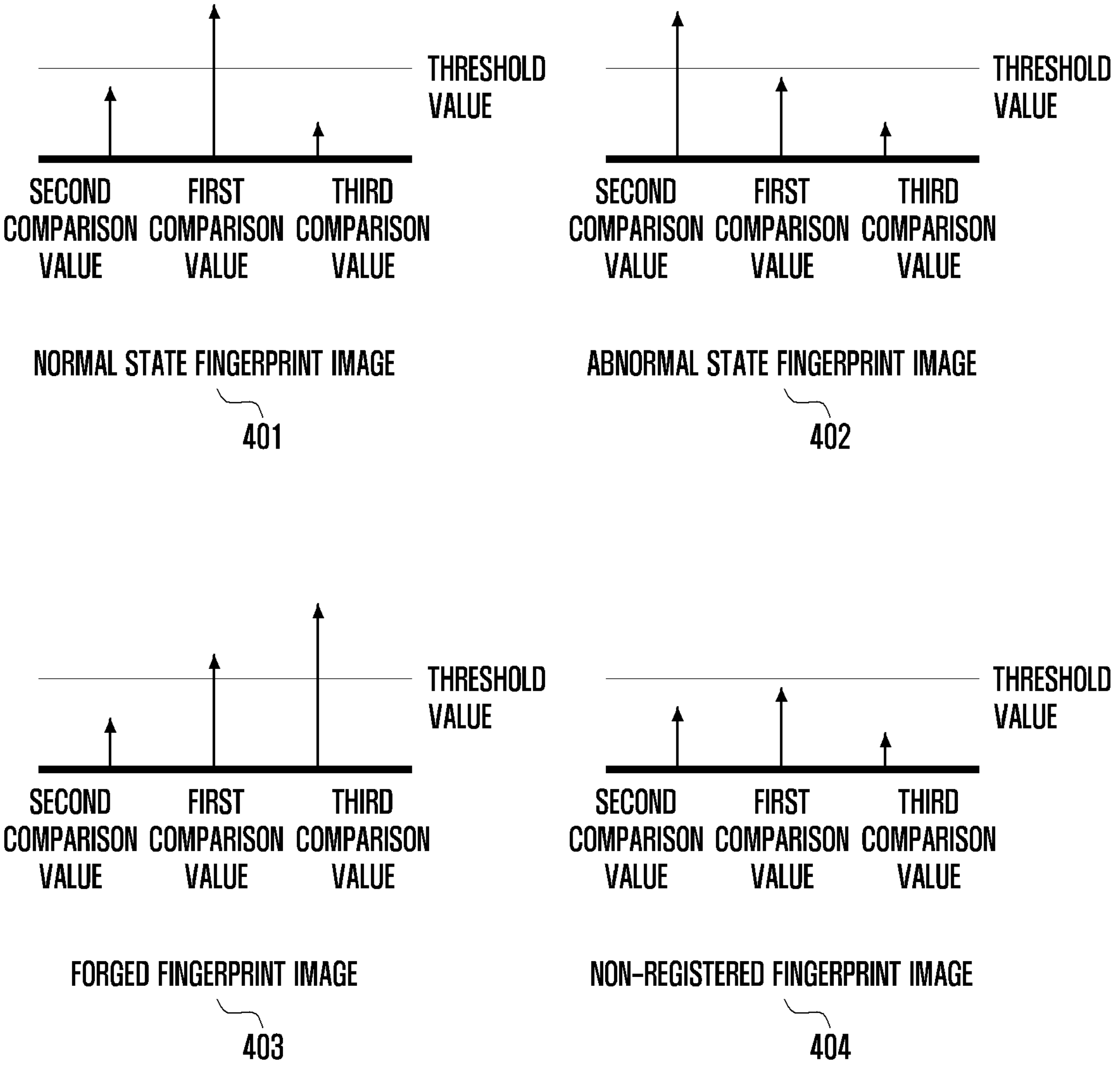
FIG. 4B is a diagram illustrating a result of an electronic device classifying input fingerprint images according to an embodiment of the disclosure.

FIG. 4B is a diagram illustrating a result of the electronic device 300 classifying input fingerprint images 315 according to an embodiment of the disclosure.

The electronic device 300 may determine the input fingerprint image 315 in which the first comparison value is greater than or equal to the threshold value and the third comparison value is less than the first comparison value, as the normal state fingerprint image 401.

The electronic device 300 may determine the input fingerprint image 315 in which the first comparison value is greater than or equal to the threshold value and the third comparison value is greater than or equal to the first comparison value, as the forged fingerprint image 403.

The electronic device 300 may determine the input fingerprint image 315 in which the first comparison value is less than the threshold value and the second comparison value is less than the threshold value, as the unregistered fingerprint image 404.

The electronic device 300 may determine the input fingerprint image 315 in which the first comparison value is less than the threshold value and the second comparison value is greater than or equal to the threshold value, as the abnormal state fingerprint image 402.

The electronic device 300 may determine fingerprint authentication as failed when the input fingerprint image 315 is the unregistered fingerprint image 404 or the forged fingerprint image 403. The electronic device 300 may determine fingerprint authentication as successful when the input fingerprint image 315 is the normal state fingerprint image 401 or the abnormal state fingerprint image 402.

Figure 5:
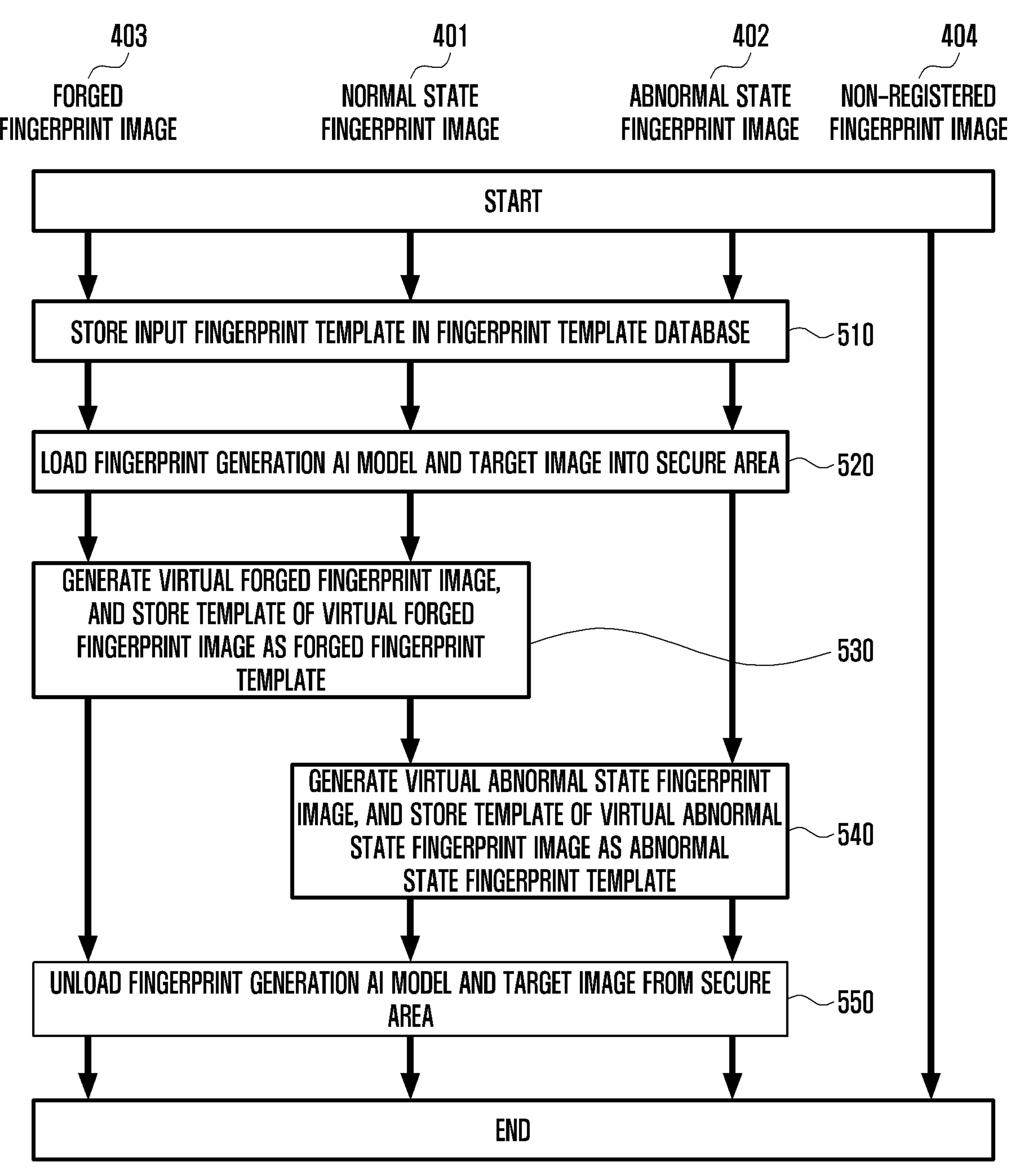
FIG. 5 is a flowchart illustrating an operation of an electronic device updating a fingerprint template database according to an embodiment.

FIG. 5 is a flowchart illustrating an operation of an electronic device updating a fingerprint template database according to an embodiment of the disclosure.

In operation 510, the electronic device 300 may store the input fingerprint template 325, which is the template of the input fingerprint image 315, in the fingerprint template database 330 when the input fingerprint image 315 is the normal state fingerprint image 401, the abnormal state fingerprint image 402, or the forged fingerprint image 403.

The electronic device 300 may store the input template 325 as the normal state fingerprint template 301 in the fingerprint template database 330 when the input fingerprint image 315 is the normal state fingerprint image 401. The electronic device 300 may store the input fingerprint template 325 as the abnormal state fingerprint template 302 in the fingerprint template database 330 when the input fingerprint image 315 is the abnormal state fingerprint image 402. The electronic device 300 may store the input fingerprint template 325 as the forged fingerprint template 303 in the fingerprint template database 330 when the input fingerprint image 315 is the forged fingerprint image 403.

In operation 520, the electronic device 300 may load the fingerprint generation AI model 370 and a target image (e.g., a target image 730 of FIG. 7) into a secure area when the input fingerprint image 315 is the normal state fingerprint image 401, the abnormal state fingerprint image 402, or the forged fingerprint image 403.

The target image (e.g., the target image 730 of FIG. 7) may be data indicating the environmental characteristics of the virtual fingerprint image generated by the fingerprint generation AI model 370. The environmental characteristics may refer to the environmental characteristics at the time of registering the fingerprint or performing fingerprint authentication, and may include, for example, environmental characteristics of the material of an object that inputs a fingerprint, such as being dry or wet. For example, the environmental characteristics may include characteristics related to the time of day (e.g., morning and afternoon) when fingerprint authentication is performed. For example, the environmental characteristics may include characteristics related to the weather (e.g., cloudy, clear, rainy, snowy, foggy, or cloudy) when fingerprint authentication is performed. For example, the environmental characteristics may include characteristics related to the season (e.g., spring, summer, fall, or winter) when fingerprint authentication is performed. For example, the environmental characteristics may include characteristics related to actions (e.g., showering, exercising, hiking, driving, cooking, or washing dishes) of a user performing fingerprint authentication. For example, the environmental characteristics may include characteristics related to a location (e.g., indoor/outdoor, desert/tropical/Mediterranean/Arctic, airplane, or countryside/city) where fingerprint authentication is performed. For example, the environmental characteristics may include characteristics related to the health status of the user performing fingerprint authentication (e.g., obesity/normal weight, blood sugar, and heart rate). The electronic device 300 may identify the environmental characteristics at the time when the user performs fingerprint authentication based on the user's information (e.g., the user's health information of a health application) included in the electronic device, and generate a virtual fingerprint image based on a target image (e.g., the target image 730 of FIG. 7) corresponding to the identified environmental characteristics.

For example, when the target image (e.g., the target image 730 of FIG. 7) is an abnormal (or forged) fingerprint image, the fingerprint generation AI model 370 may generate an abnormal (or forged) virtual fingerprint image. However, since the fingerprint generation AI model 370 generates the virtual fingerprint image of the user corresponding to the input fingerprint image 315, the target image may not instruct the fingerprint generation AI model 370 to generate a virtual fingerprint image of a person having a fingerprint corresponding to the target image (e.g., the target image 730 of FIG. 7).

An area on the memory (e.g., memory 1320 of FIG. 13) included in the electronic device 300 may include a secure area and a general area. The secure area may refer to an area where the operation of the electronic device 300 can be performed while maintaining security. The electronic device 300 may restrict external access to the virtual fingerprint image generated by the fingerprint generation AI model 370 by loading the fingerprint generation AI model 370 and the target image (e.g., the target image 730 of FIG. 7) into the secure area. For example, the secure area may be a separate area provided within the processor 110. The secure area may be a separate area provided outside of the processor 110 (e.g., an embedded secure element {eSE} or a secure processor). For example, the secure area may correspond to the Trustzone™ developed by ARM™. For example, the secure area may be implemented as a hypervisor.

In operation 530, the electronic device 300 may generate a virtual forged fingerprint image based on the input fingerprint image 315 when the input fingerprint image 315 is the normal state fingerprint image 401 or the forged fingerprint image 403, and store a template of the virtual forged fingerprint image as the forged fingerprint template 303.

In operation 540, when the input fingerprint image 315 is the normal state fingerprint image 401 or the abnormal state fingerprint image 402, the electronic device 300 may generate a virtual abnormal state fingerprint image based on the input fingerprint image 315 and store a template of the virtual abnormal state fingerprint image as the abnormal state fingerprint template 302.

The electronic device 300 may generate a virtual fingerprint image representing a fingerprint of the same person as the input fingerprint image 315. The electronic device 300 may input the input fingerprint image 315 into the fingerprint generation AI model 370 and generate a virtual fingerprint image that maintains (or has) the structural characteristics of the input fingerprint image 315. Since the structural characteristics of the input fingerprint image 315 are maintained, the virtual fingerprint image may be the fingerprint image representing the fingerprint of the same person as the input fingerprint image 315. The electronic device 300 may input the input fingerprint image 315 into the fingerprint generation AI model 370 and generate a virtual fingerprint image that maintains the environmental characteristics of the target image.

In operation 550, the electronic device 300 may unload the fingerprint generation AI model 370 and the target image from the secure area when the input fingerprint image 315 is the normal state fingerprint image 401, the abnormal state fingerprint image 402, or the forged fingerprint image 403.

It should be understood that the operation of the electronic device 300 generating the virtual fingerprint image using the fingerprint generation AI model 370 in the secure area is an operation to maintain security for the generated virtual fingerprint image, and that the fingerprint generation AI model 370 cannot be used only in the secure area. For example, the fingerprint generation AI model 370 may generate the virtual fingerprint image even in the general area.

FIG. 6 is a diagram illustrating an operation of an electronic device updating a fingerprint template according to an embodiment of the disclosure.

Update determination units 611, 612, 613, 621, 622, 631, and 632 may perform an operation of identifying the image quality of the input fingerprint image 315 (e.g., the normal state fingerprint image 401, the abnormal state fingerprint image 402, or the forged fingerprint image 403). The image quality may be determined based on the degree to which the structural characteristics of the input fingerprint image 315 can be recognized. When the fingerprint image (e.g., the input fingerprint image 315 or the virtual fingerprint images 412, 413, 422, and 433) can recognize corresponding structural characteristics, the update determination units 611, 612, 613, 621, 622, 631, and 632 may determine the image quality of the fingerprint image (e.g., the input fingerprint image 315 or the virtual fingerprint images 412, 413, 422, and 433) as the image quality that instructs the generation of the virtual fingerprint images 412, 413, 422, and 433.

The update determination units 611, 612, 613, 621, 622, 631, and 632 may determine whether to store the fingerprint image (e.g., the input fingerprint image 315, or the virtual fingerprint images 412, 413, 422, and 433) in the fingerprint template database 330 based on the image quality of the fingerprint image (e.g., the input fingerprint image 315 or the virtual fingerprint images 412, 413, 422, and 433).

The update determination units 611, 612, 613, 621, 622, 631, and 632 may compare the input fingerprint image 315 (e.g., the normal state fingerprint image 401, the abnormal state fingerprint image 402, or the forged fingerprint image 403) with a fingerprint template (e.g., the normal state fingerprint template 301, the abnormal state fingerprint template 302, or the forged fingerprint template 303) included in the fingerprint template database 330. When the similarity between the input fingerprint image 315 and the fingerprint template (e.g., the normal state fingerprint template 301, the abnormal state fingerprint template 302, or the forged fingerprint template 303) included in the fingerprint template database 330 is greater than or equal to a threshold value, the update determination units 611, 612, 613, 621, 622, 631, and 632 may determine the fingerprint image to generate the virtual fingerprint images 412, 413, 422, and 433 based on the input fingerprint image 315. The update determination units 611, 612, 613, 621, 622, 631, and 632 may determine whether to store the template of the fingerprint image (e.g., the input fingerprint image 315 or the virtual fingerprint images 412, 413, 422, and 433) in the fingerprint template database 330, based on whether the similarity of the fingerprint image (e.g., the input fingerprint image (315) and the virtual fingerprint image 412, 413, 422, and 433) compared to the fingerprint template included in the fingerprint template database is greater than or equal to the threshold value.

The update determination units 611, 612, 613, 621, 622, 631, and 632 may determine whether to store the fingerprint image (e.g., the input fingerprint image 315 or the virtual fingerprint images 412, 413, 422, and 433) in the fingerprint template database, based on at least one of the similarity and image quality with the fingerprint template (e.g., the normal state fingerprint template 301, the abnormal state fingerprint template 302, and the forged fingerprint template 303) included in the fingerprint template database 330. The update determination units 611, 612, 613, 621, 622, 631, and 632 may determine whether to generate the virtual fingerprint images 412, 413, 422, and 433 based on the fingerprint image (e.g., the input fingerprint image 315 or the virtual fingerprint images 412, 413, 422, and 433), based on at least one of the similarity and image quality with the fingerprint template (e.g., the normal state fingerprint template 301, the abnormal state fingerprint template 302, and the forged fingerprint template 303) included in the fingerprint template database 330. The similarity and image quality with the fingerprint templates (e.g., the normal state fingerprint template 301, the abnormal state fingerprint template 302, or the forged fingerprint template 303) included in the fingerprint template database are only examples. The update determination units 611, 612, 613, 621, 622, 631, and 632 may determine whether to generate the virtual fingerprint image or whether to store the fingerprint image (e.g., the input fingerprint image 315 or the virtual fingerprint images 412, 413, 422, and 433) in the fingerprint template database 330 based on a combination of various conditions including the examples.

The fingerprint generation AI models 615, 616, 625, and 635 may generate the virtual fingerprint images 412, 413, 422, and 433 based on the input fingerprint image 315 whose image quality is greater than or equal to a designated value. In addition, the fingerprint image that can be input to the fingerprint generation AI models 615, 616, 625, and 635 is not limited to the input fingerprint image 315. The fingerprint generation AI models 615, 616, 625, and 635 may also generate a virtual fingerprint image that maintains the structural characteristics of the generated virtual fingerprint images 412, 413, 422, and 433.

The operations of the update determination units 611, 612, 613, 621, 622, 631, and 632 and the fingerprint generation AI models 615, 616, 625, and 635 can be executed by the processor included in the electronic device.

According to FIG. 4A, the input fingerprint image 315 may be classified into the abnormal state fingerprint image 402, the normal state fingerprint image 401, or the forged fingerprint image 403 depending on the operation of the electronic device classify the input fingerprint image 315. Hereinafter, the operation of the electronic device 300 that generates the virtual fingerprint images 412, 413, 422, and 433 based on the input fingerprint image 315 classified into the abnormal state fingerprint image 402, the normal state fingerprint image 401, or the forged fingerprint image 403 will be described.

The electronic device 300 may identify the image quality of the first fingerprint image 401 based on the update determination unit 611 when the input fingerprint image 315 is the first fingerprint image 401 classified as the normal state fingerprint image 401. The electronic device 300 may determine the first fingerprint image 401 as an image quality that instructs the generation of the virtual fingerprint image when the first fingerprint image 401 is clearly acquired and structural characteristics can be recognized. The electronic device 300 may store the first fingerprint image 401 whose determined image quality is greater than or equal to a designated value as the normal state fingerprint template 301 of the fingerprint template database 330.

The operation of the update determination unit 611 determining whether to generate the virtual fingerprint image based on the image quality of the first fingerprint image 401 and the operation of determining whether to store the first fingerprint image 401 in the fingerprint template are examples. The update determination unit 611 may determine whether to generate the virtual fingerprint image based on a predetermined condition or whether to store the first fingerprint image 401 in the normal state fingerprint template 301.

The electronic device 300 may generate the virtual abnormal state fingerprint image 412 based on the first fingerprint image 401 having image quality greater than or equal to a designated value using the first fingerprint generation AI model 615. In addition, the electronic device 300 may additionally generate the virtual abnormal state fingerprint image 412 based on the generated virtual abnormal state fingerprint image 412, using the first fingerprint generation AI model 615. The electronic device 300 may identify the image quality of the generated virtual abnormal state fingerprint image 412 based on the update determination unit 612. When the identified image quality is greater than or equal to the designated value, the electronic device 300 may store the generated virtual abnormal state fingerprint image 412 as the abnormal state fingerprint template 302 of the fingerprint template database 330. The operation of determining whether to generate the virtual fingerprint image based on the image quality of the virtual abnormal state fingerprint image 412 by the update determination unit 612 and the operation of determining whether to store the virtual abnormal state fingerprint image 412 in the fingerprint template are examples. The update determination unit 612 may determine whether to generate the virtual fingerprint image based on a predetermined condition or determine whether to store the virtual abnormal state fingerprint image 412 in the abnormal state fingerprint template 302.

The electronic device 300 may train the first fingerprint generation AI model 615 to generate an image similar to the generated virtual abnormal state fingerprint image 412 based on the generated virtual abnormal state fingerprint image 412 when the identified image quality is greater than or equal to the designated value.

The electronic device 300 may generate the virtual forged fingerprint image 413 based on the first fingerprint image 401 having the image quality greater than or equal to the designated value using the second fingerprint generation AI model 616. In addition, the electronic device 300 may additionally generate the virtual forged fingerprint image 413 based on the generated virtual forged fingerprint image 413 using the second fingerprint generation AI model 616. The electronic device 300 may identify the image quality of the generated virtual forged fingerprint image 413 based on the update determination unit 613. When the identified image quality is greater than or equal to the designated value, the electronic device 300 may store the generated virtual forged fingerprint image 413 as the forged fingerprint template 303 in the fingerprint template database 330. The operation of the update determination unit 613 determining whether to generate the virtual fingerprint image based on the image quality of the virtual forged fingerprint image 413 and the operation of determining whether to store the virtual forged fingerprint image 413 in the fingerprint template are examples. The update determination unit 613 may determine whether to generate the virtual fingerprint image or whether to store the virtual forged fingerprint image 413 in the forged fingerprint template 303 based on a predetermined condition.

The electronic device 300 may train the second fingerprint generation AI model 616 to generate an image similar to the generated forged fingerprint image 413 based on the generated virtual forged fingerprint image 413 when the identified image quality is greater than or equal to the designated value.

The electronic device 300 may identify the image quality of the second fingerprint image 402 based on the update determination unit 621 when the input fingerprint image 315 is the second fingerprint image 402 classified as the abnormal state fingerprint image 402. The electronic device 300 may determine the second fingerprint image 402 as the image quality that instructs the generation of the virtual fingerprint image when the second fingerprint image 402 is clearly acquired to recognize the structural characteristics. The electronic device 300 may store the second fingerprint image 402 whose determined image quality is greater than or equal to the designated value as the abnormal state fingerprint template 302 of the fingerprint template database 330. The operation of the update determination unit 621 determining whether to generate the virtual fingerprint image based on the image quality of the second fingerprint image 402 and the operation of determining whether to store the second fingerprint image 402 in the abnormal state fingerprint template 302 are examples. The update determination unit 621 may determine whether to generate the virtual fingerprint image according to a predetermined condition or whether to store the second fingerprint image 402 in the abnormal state fingerprint template 302.

The electronic device 300 may generate the virtual abnormal state fingerprint image 422 based on the second fingerprint image 402 whose image quality is greater than or equal to the designated value using the third fingerprint generation AI model 625. In addition, the electronic device 300 may additionally generate the virtual abnormal state fingerprint image 422 based on the generated virtual abnormal state fingerprint image 422 using the third fingerprint generation AI model 625. The electronic device 300 may identify the image quality of the generated virtual abnormal state fingerprint image 422 based on the update determination unit 622. When the identified image quality is greater than or equal to the designated value, the electronic device 300 may store the generated virtual abnormal state fingerprint image 422 as the abnormal state fingerprint template 302 of the fingerprint template database 330. The operation of determining whether to generate a virtual fingerprint image based on the image quality of the virtual abnormal state fingerprint image 422 by the update determination unit 622 and the operation of determining whether to store the virtual abnormal state fingerprint image 422 in the abnormal state fingerprint template 302 are examples. The update determination unit 622 may determine whether to generate the virtual fingerprint image based on the predetermined condition or determine whether to store the virtual abnormal state fingerprint image 422 in the abnormal state fingerprint template 302.

The electronic device 300 may train the third fingerprint generation AI model 625 to generate an image similar to the generated virtual abnormal state fingerprint image 422 based on the generated virtual abnormal state fingerprint image 422 when the identified image quality is greater than or equal to the designated value.

The electronic device 300 may identify the image quality of the third fingerprint image 403 based on the update determination unit 631 when the input fingerprint image 315 is the third fingerprint image 403 classified as the forged fingerprint image 403. When the third fingerprint image 403 is clearly acquired and the structural characteristics can be recognized, the electronic device 300 may determine the third fingerprint image 403 as the image quality that instructs the generation of the virtual fingerprint image. The electronic device 300 may store the third fingerprint image 403 whose determined image quality is greater than or equal to the designated value as the forged fingerprint template 303 in the fingerprint template database 330. The operation of the update determination unit 631 determining whether to generate the virtual fingerprint image based on the image quality of the third fingerprint image 403 and the operation of determining whether to store the third fingerprint image 403 in the forged fingerprint template 303 are examples. The update determination unit 631 may determine whether to generate the virtual fingerprint image or whether to store the third fingerprint image 403 in the forged fingerprint template 303 based on a predetermined condition.

The electronic device 300 may generate the virtual forged fingerprint image 433 based on the third fingerprint image 403 whose image quality is greater than or equal to the designated value by using the fourth fingerprint generation AI model 635. In addition, the electronic device 300 may additionally generate the virtual forged fingerprint image 433 based on the generated virtual forged fingerprint image 433 by using the fourth fingerprint generation AI model 635. The electronic device 300 may identify the image quality of the generated virtual forged fingerprint image 433 based on the update determination unit 632. When the identified image quality is greater than or equal to the designated value, the electronic device 300 may store the generated virtual forged fingerprint image 433 as the forged fingerprint template 303 in the fingerprint template database 330.

The operation of the update determination unit 632 determining whether to generate the virtual fingerprint image based on the image quality of the virtual forged fingerprint image 433 and the operation of determining whether to store the virtual forged fingerprint image 433 in the forged fingerprint template 303 are examples. The update determination unit 632 may determine whether to generate the virtual fingerprint image or whether to store the virtual forged fingerprint image 433 in the forged fingerprint template 303 based on a predetermined condition.

The electronic device 300 may train the fourth fingerprint generation AI model 635 to generate an image similar to the generated virtual forged fingerprint image 433 based on the generated virtual forged fingerprint image 433 when the identified image quality is greater than or equal to the designated value.

The electronic device 300 may perform fingerprint authentication based on not only the registered fingerprint image but also the input fingerprint image 315 by storing the input template in the fingerprint template database 330. Since the electronic device 300 performs fingerprint authentication based on the recently input user's input fingerprint image 315, it is possible to perform accurate fingerprint authentication even when the user's fingerprint changes over time. In addition, the electronic device 300 may generate the virtual fingerprint images 412, 413, 422, and 433 that maintain the structural characteristics of the input fingerprint image 315, and perform fingerprint authentication based on the template of the virtual fingerprint images 412, 413, 422, and 433. Since the number of virtual fingerprint images 412, 413, 422, and 433 that can be generated is not limited, the electronic device 300 may secure a sufficient amount of fingerprint templates. In particular, it is difficult to secure data related to abnormal state fingerprint images 402 and forged fingerprint images 403, but the electronic device 300 may generate the virtual abnormal state fingerprint images 422 and 412 and the virtual forged fingerprint images 433 and 413 based on the normal state fingerprint image 401.

The electronic device 300 may train the fingerprint generation AI models 615, 616, 625, and 635 by using the input fingerprint image 315 and/or the virtual fingerprint images 412, 413, 422, and 433 as learning data. Since the fingerprint generation AI models 615, 616, 625, and 635 are trained based on the user's input fingerprint image 315 or the virtual fingerprint images 412, 413, 422, and 433 similar to the user's input fingerprint image, the performance of the fingerprint generation AI models 615, 616, 625, and 635 may be gradually improved depending on the user's fingerprint authentication attempt.

FIG. 7 is a diagram illustrating a fingerprint generation AI model of an electronic device according to an embodiment of the disclosure.

A fingerprint generation AI model 720 (e.g., the fingerprint generation AI model 370 of FIG. 3 or the fingerprint generation AI models 615, 616, 625, and 635 of FIG. 6) may receive an input fingerprint image 710 (e.g., the input fingerprint image 315 of FIG. 3) and generate a virtual fingerprint image 740 (e.g., the virtual fingerprint images 412, 413, 422, and 433 of FIG. 6) that maintains the structural characteristics of the input fingerprint image 710. For example, the fingerprint generation AI model 720 may generate the virtual fingerprint image 740 representing the fingerprint of the same person as the input fingerprint image 710. The fingerprint generation AI model 720 may receive one input fingerprint image 710 and generate at least one virtual fingerprint image 740. In addition, the fingerprint generation AI model 720 may generate the separate virtual fingerprint image 740 based on the generated virtual fingerprint image 740.

The fingerprint generation AI model 720 may generate the virtual fingerprint image 740 that maintains the environmental characteristics of the target image 730. The environmental characteristics may refer to environmental characteristics at the time of registering a fingerprint or performing fingerprint authentication, and include, for example, environmental characteristics of the material of an object that inputs a fingerprint, such as being dry or wet. For example, when the target image 730 is an abnormal (or forged) fingerprint image, the fingerprint generation AI model 720 may generate the abnormal (or forged) state virtual fingerprint image 740.

The fingerprint generation AI model 720 may be trained based on the input fingerprint image 710 and/or the virtual fingerprint image 740. For example, the fingerprint generation AI model 720 may be trained to generate an image similar to the input fingerprint image 710 and/or the virtual fingerprint image 740. The fingerprint generation AI model 720 may be trained based on the input fingerprint image 710 and/or the virtual fingerprint image 740 whenever the input fingerprint image 710 is newly input, thereby generating the virtual fingerprint image 740 having a high similarity to the user's fingerprint.

The fingerprint generation AI model 720 may be learned externally or within the electronic device. The fingerprint generation AI model 720 may be a pre-trained AI model and may be additionally trained externally or within the electronic device 300. When fingerprint generation AI model

720 is learned externally, the fingerprint generation AI model 720 within the electronic device 300 may be updated with the fingerprint generation AI model additionally trained from an external server. However, the fingerprint generation AI model 720 may be combined with a fingerprint generation AI model in which information included in the fingerprint generation AI model 720 in the electronic device is updated. The training results of the existing fingerprint generation AI model 720 may be applied to the updated fingerprint generation AI model.

The fingerprint generation AI model 720 may be adjusted in a manner of removing parameters with low importance from the fingerprint generation AI model 720, so that the number of parameters included in the fingerprint generation AI model 720 may be reduced. In addition, the fingerprint generation AI model 720 may be adjusted according to a knowledge distillation, low-rank approximation, neural architecture search, quantization, and pruning during training method.

The electronic device may generate a prompt to perform generation of a virtual image (e.g., the virtual fingerprint image 740) based on at least one image (e.g., a fingerprint image), an index related to at least one image (e.g., a fingerprint image), and parameter information related to the image (e.g., a fingerprint image). The image (e.g., the fingerprint image or the virtual fingerprint image 740) may be used as a prompt source for generating the virtual fingerprint image 740. The image may include image-based content. The electronic device may generate a prompt to perform generation of the virtual fingerprint image 740 based on the input fingerprint image 710 input through the sensor 170 or 310.

The electronic device may generate (or acquire) the virtual fingerprint image 740 in relation to the generated prompt. The electronic device may receive a prompt source (e.g., the input fingerprint image 710) related to the generation of the virtual fingerprint image 740 based on the interaction with the user, and generate (e.g., regenerate or reconfigure) the virtual fingerprint image 740 in a server or on-device based on the prompt source. The electronic device may provide the prompt to the on-device and/or server's generative AI to execute a process for generating the virtual fingerprint image 740 based on the generated prompt. The electronic device may provide the prompt (e.g., a question or instruction input to the generative AI) requesting the generation of the virtual fingerprint image 740 to the generative AI. The electronic device may generate (or acquire) the virtual fingerprint image 740 according to the process of the virtual fingerprint image 740 executed in relation to the prompt in the on-device AI. The electronic device may receive (or acquire) the virtual fingerprint image 740 according to the process of generating the virtual fingerprint image 740 executed in relation to the prompt in the server AI from the server.

Figure 8:
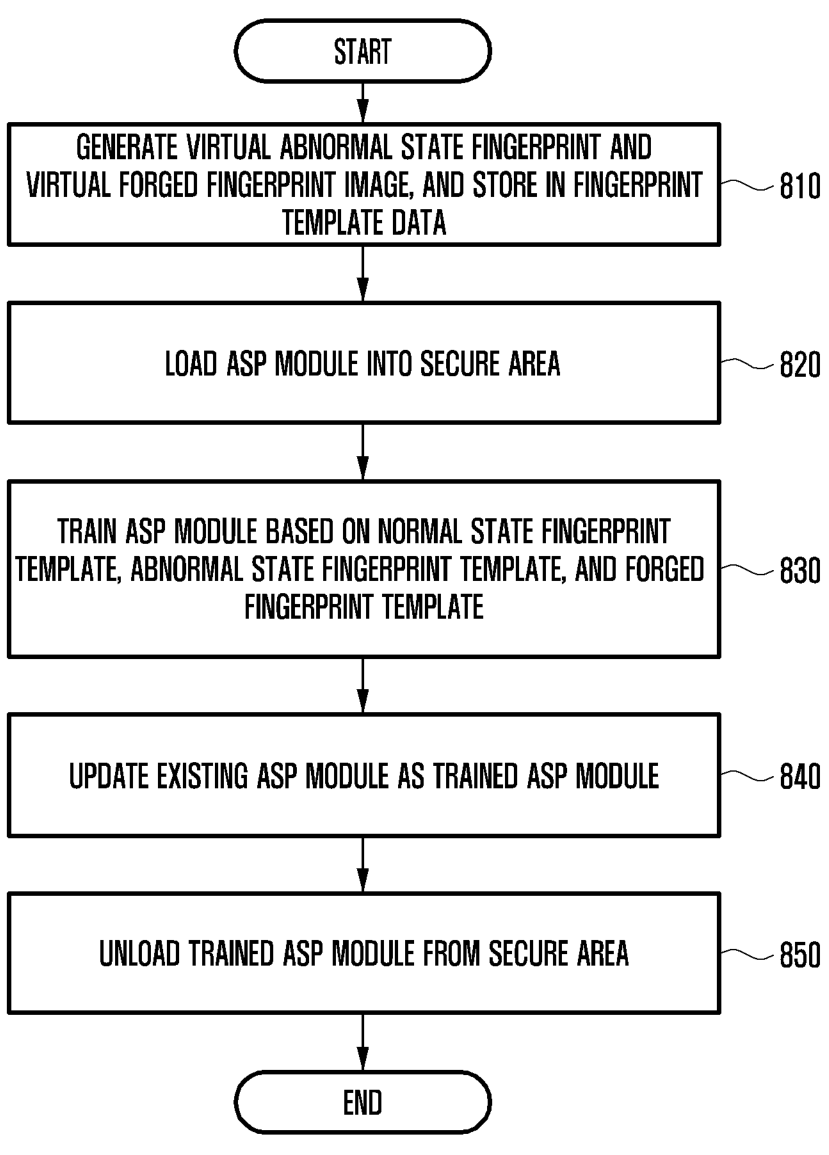
FIG. 8 is a flowchart illustrating an operation of learning an ASP module according to an embodiment of the disclosure.

FIG. 8 is a flowchart illustrating an operation of training an ASP module according to an embodiment of the disclosure.

In operation 810, the electronic device 300 may generate virtual abnormal state fingerprint images 412 and 422 and virtual forged fingerprint images 413 and 433, and store the generated images in the fingerprint template database 330.

The electronic device 300 may store the input fingerprint image 315 and a template of a virtual fingerprint image generated based on the input fingerprint image 315 in the fingerprint template database 330. The operation of generating the virtual fingerprint image according to the classification of the input fingerprint images is omitted since it has been described in FIGS. 5 and 6.

In operation 820, the electronic device 300 may load the ASP module 350 into the secure area.

In operation 830, the electronic device 300 may train the ASP module 350 based on the normal state fingerprint template 301, the abnormal state fingerprint template 302, and the forged fingerprint template 303.

The electronic device 300 may train the ASP module 350 based the input fingerprint image 315 corresponding to the normal state fingerprint template 301, the abnormal state fingerprint template 302, and the forged fingerprint template 303, and the template of the virtual fingerprint image generated based on the input fingerprint image 315. The data for training the ASP module 350 by the electronic device 300 will be described in FIG. 9.

In operation 840, the electronic device 300 may update the existing ASP module 350 with the trained ASP module 350.

In operation 850, the electronic device 300 may unload the trained ASP module 350 from the secure area.

Figure 9:
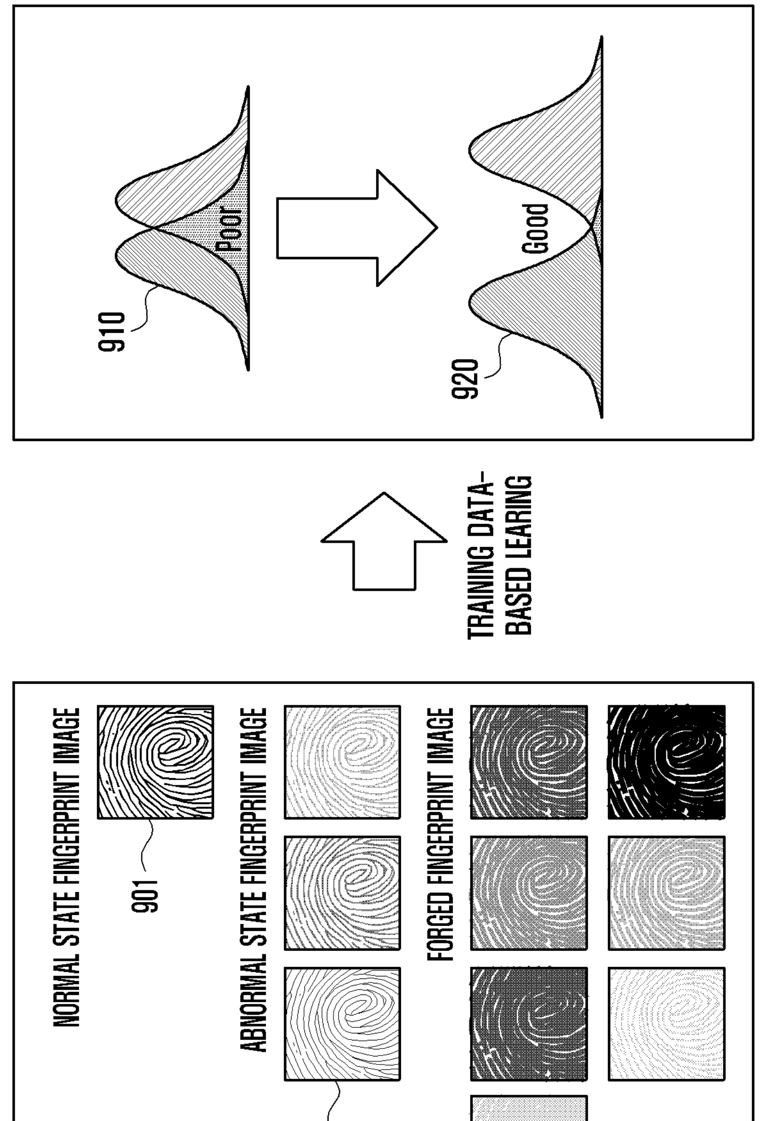
FIG. 9 is a diagram illustrating an ASP module according to an embodiment of the disclosure.

FIG. 9 is a diagram illustrating the ASP module 350 according to an embodiment of the disclosure.

The ASP module 350 may be a model that distinguishes between a forged fingerprint image 903 and non-forged fingerprint images 901 and 902. The ASP module 910 is a pre-trained AI model, but may be fine-tuned within the electronic device 300. The description of training of the ASP module 350 is a description of fine-tuning. The ASP module 350 may be trained based on a fingerprint image of a user of the electronic device 300. The ASP module 910 before training may be an AI model that determines whether an unspecified fingerprint image is forged. The ASP module 350 may be trained based on the fingerprint image of the user of the electronic device 300. Before being trained, the ASP module 910 may incorrectly determine whether some of the fingerprint images of the user are forged and determine the fingerprint images of the user as forged fingerprint images 903. For example, when the user's fingerprint is not forged but has characteristics similar to a fingerprint forged with gelatin, the ASP module 910 before being trained may determine the user's fingerprint image as the forged fingerprint image 903.

The electronic device 300 may train the ASP module 350 based on the normal state fingerprint template 301, the abnormal state fingerprint template 302, and the forged fingerprint template 303. The electronic device 300 may train the ASP module 350 based on the input fingerprint image 315 corresponding to the normal state fingerprint template 301, the abnormal state fingerprint template 302, and the forged fingerprint template 303 and the template of the virtual fingerprint image generated based on the input fingerprint image 315.

The electronic device 300 may train the ASP module 350 to determine the normal state fingerprint image 901 and the abnormal state fingerprint image 902 as the non-forged fingerprint images based on the normal state fingerprint template 301 and the abnormal state fingerprint template 302. The abnormal state fingerprint template 302 may include templates corresponding to not only the abnormal state fingerprint image 902, which is the input fingerprint image, but also the virtual abnormal state fingerprint image (e.g., the virtual abnormal state fingerprint images 412 and 422 of FIG. 6).

The electronic device 300 may train the ASP module 350 to determine that the forged fingerprint image 903 is forged based on the forged fingerprint template 303. The forged fingerprint template 303 may include templates corresponding to not only the forged fingerprint image 903, which is the input fingerprint image, but also the virtual forged fingerprint image (e.g., the virtual forged fingerprint images 413 and 433 of FIG. 6).

The electronic device 300 may be trained to determine whether a fingerprint image is forged based on the user's fingerprint image. Since the electronic device 300 can generate a large number of virtual fingerprint images based on the input fingerprint image 315, the electronic device 300 may acquire a large number of user's fingerprint images for training the ASP module 350. The ASP module 920 trained based on the large number of user's fingerprint images may have an increased accuracy in determining whether the user's fingerprint image is forged.

Figure 10:
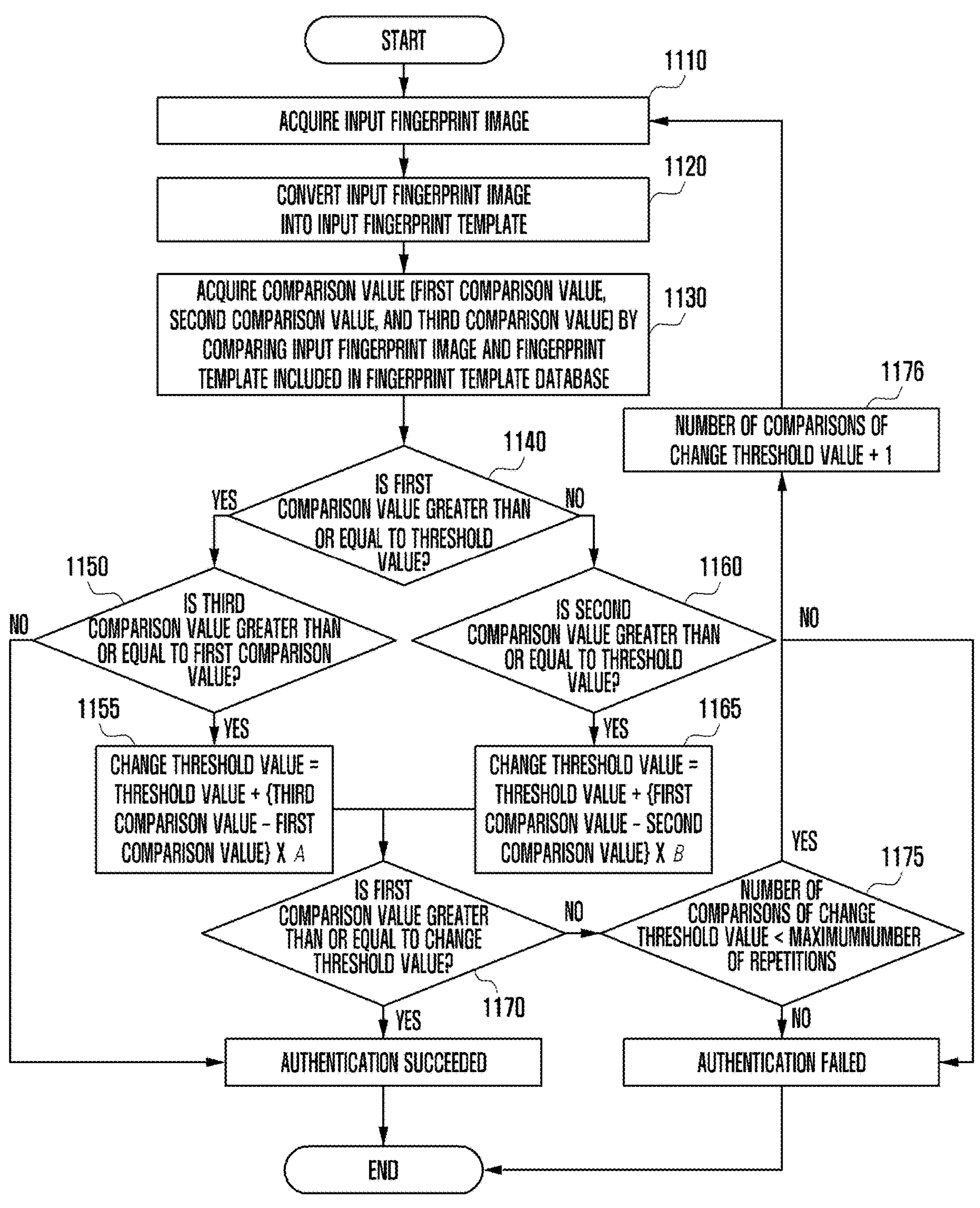
FIG. 10 is a flowchart illustrating an operation of an electronic device performing fingerprint authentication according to an embodiment of the disclosure.

FIG. 10 is a flowchart illustrating an operation of an electronic device performing fingerprint authentication according to an embodiment of the disclosure.

In operation 1110, the electronic device 300 may acquire an input fingerprint image. Operation 1110 may be the same operation as operation 410 described in FIG. 4A.

In operation 1120, the electronic device 300 may convert the input fingerprint image into the input fingerprint template 325 which is an embedding vector. Operation 1120 may be the same operation as operation 420 described in FIG. 4A.

In operation 1130, the electronic device 300 may acquire a comparison value by comparing the input fingerprint template 325 and a fingerprint template included in a fingerprint template database. Operation 1130 may be the same operation as operation 430 described in FIG. 4A.

In operation 1140, the electronic device 300 may identify whether the first comparison value is greater than or equal to a threshold value. Operation 1140 may be the same operation as operation 440 described in FIG. 4A.

In operation 1150, the electronic device 300 may determine whether a third comparison value is greater than or equal to a first comparison value in response to the fact that the first comparison value is greater than or equal to the threshold value. Operation 1150 may be the same operation as operation 450 described in FIG. 4A.

In operation 1155, the electronic device 300 may change the threshold value to a change threshold value in response to the fact that the third comparison value is greater than or equal to the first comparison value in operation 1155. The electronic device 300 may set the change threshold value to have a larger value than the threshold value. The electronic device 300 may set the change threshold value to have a larger value as a difference between the third comparison value and the first comparison value increases. The electronic device 300 may determine that authentication has failed when the first comparison value is less than the change threshold value set to have a larger value than the threshold value by setting the change threshold value to have a larger value than the threshold value. The change threshold value may be expressed as in Equation 1.

$$\text{Change threshold value} = \text{threshold value} + (\text{third comparison value} - \text{first comparison value}) \times \alpha, \quad (\alpha \text{ is a constant}) \qquad \text{Equation 1}$$

When the first comparison value is greater than or equal to the threshold value and the third comparison value is greater than or equal to the first comparison value, the input fingerprint image may be similar to a forged fingerprint image. The electronic device may determine the fingerprint authentication result as failed even in a situation where the degree of similarity between the input fingerprint image and the registered fingerprint image exceeds the threshold value by setting the threshold value high when the input fingerprint image is similar to the forged fingerprint image.

In operation 1160, the electronic device 300 may identify whether the second comparison value is equal to or greater than the threshold value in response to the fact that the first comparison value is less than the threshold value. Operation 1160 may be the same operation as operation 460 described in FIG. 4A.

In operation 1165, the electronic device 300 may change the threshold value to a change threshold value in response to that fact that the second comparison value is greater than or equal to the threshold value. The electronic device 300 may set the change threshold value to have a lower value than the threshold value. The electronic device 300 may set the change threshold value to have a lower value as a difference between the first comparison value and the second comparison value increases. The electronic device 300 may determine that authentication had succeeded when the first comparison value is greater than or equal to the change threshold value set to a lower value than the threshold value by setting the change threshold value to have a lower value than the threshold value. The change threshold value may be expressed as Equation 2.

$$\text{Change threshold value} = \text{threshold value} + (\text{first comparison value} - \text{second comparison value}) \times \beta, \quad (\beta \text{ is a constant}) \qquad \text{Equation 2}$$

In operation 1170, the electronic device 300 may identify whether the first comparison value is greater than or equal to the change threshold value The electronic device 300 may determine the fingerprint authentication result as successful in response to the fact that the first comparison value is greater than or equal to the change threshold value.

In operation 1175, the electronic device 300 may identify whether the number of comparisons of the change threshold value is less than the maximum number of repetitions when the first comparison value is less than the change threshold value.

The electronic device 300 may determine the fingerprint authentication result as failed when the number of comparisons of the change threshold value is greater than or equal to the maximum number of repetitions.

In operation 1176, when the number of comparisons of the change threshold value is less than the maximum number of repetitions, the electronic device 300 may add 1 to the number of comparisons of the change threshold value, and perform the operation of performing fingerprint authentication again from operation 1110.

The electronic device 300 may determine that the input fingerprint image may be similar to the abnormal state fingerprint image when the second comparison value is greater than or equal to the threshold value in operation 1160. When the input fingerprint image is similar to the abnormal state fingerprint image, the electronic device may determine the fingerprint authentication result as successful even in a situation where the degree to which the input fingerprint image is similar to the registered fingerprint image does not exceed the threshold value by setting the threshold value lower (change threshold value in operation 1165).

Figure 11:
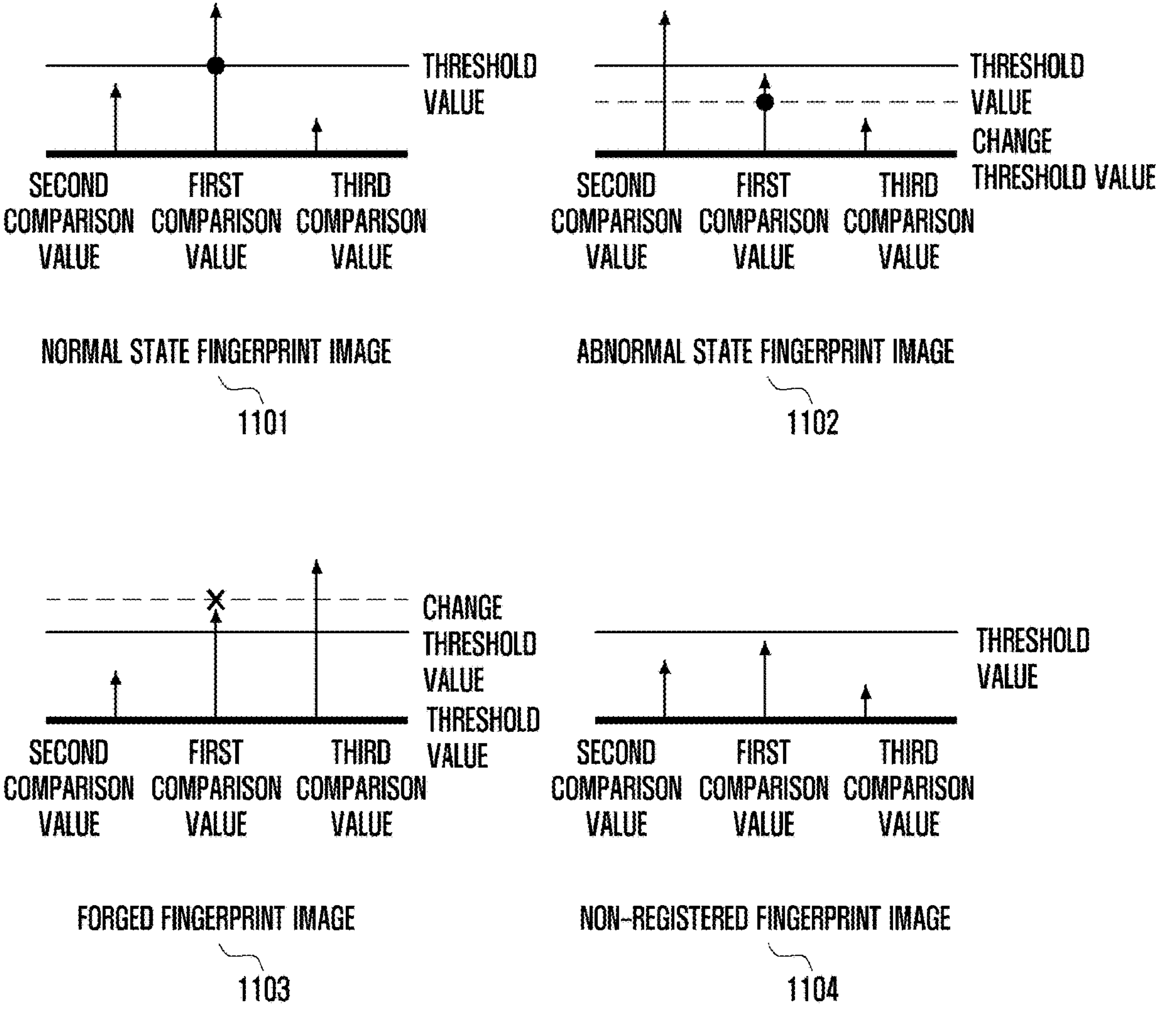
FIG. 11 is a diagram illustrating a fingerprint authentication result of an input fingerprint image according to an embodiment of the disclosure.

FIG. 11 is a diagram illustrating a fingerprint authentication result of an input fingerprint image according to an embodiment of the disclosure.

The electronic device 300 may determine the fingerprint authentication result as successful when the first comparison value is greater than or equal to the threshold value and the third comparison value is less than the first comparison value.

The electronic device 300 may change the threshold value to a change threshold value having a value greater than the threshold value when the first comparison value is greater than or equal to the threshold value and the third comparison value is greater than or equal to the first comparison value. The electronic device 300 may determine fingerprint authentication as successful in response to the fact that the first comparison value is greater than or equal to the change threshold value, and determine fingerprint authentication as failed in response to that fact that the first comparison value is less than the change threshold value.

The electronic device 300 may determine the fingerprint authentication result as failed when the first comparison value is less than the threshold value and the second comparison value is less than the threshold value. For example, the electronic device 300 may determine the fingerprint authentication result of an unregistered fingerprint image 1104 as failed.

The electronic device 300 may change the threshold value to a change threshold value having a lower value than the threshold value when the first comparison value is less than the threshold value and the second comparison value is greater than or equal to the threshold value. The electronic device 300 may determine the fingerprint authentication as successful in response to the fact that the first comparison value is greater than or equal to the change threshold value, and determine the fingerprint authentication result as failed in response to the fact that the first comparison value is less than the change threshold value.

According to the fingerprint authentication result, a normal state fingerprint image 1101 may succeed in fingerprint authentication. An abnormal state fingerprint image 1102 may succeed in fingerprint authentication in response to that fact that the first comparison value exceeds the change threshold value even when the first comparison value is less than the threshold value. A forged fingerprint image 1103 may fail in fingerprint authentication in response to the fact that the first comparison value is less than the change threshold value even when the first comparison value is greater than or equal to the threshold value. An unregistered fingerprint image 1104 may fail in fingerprint authentication.

Figure 12:
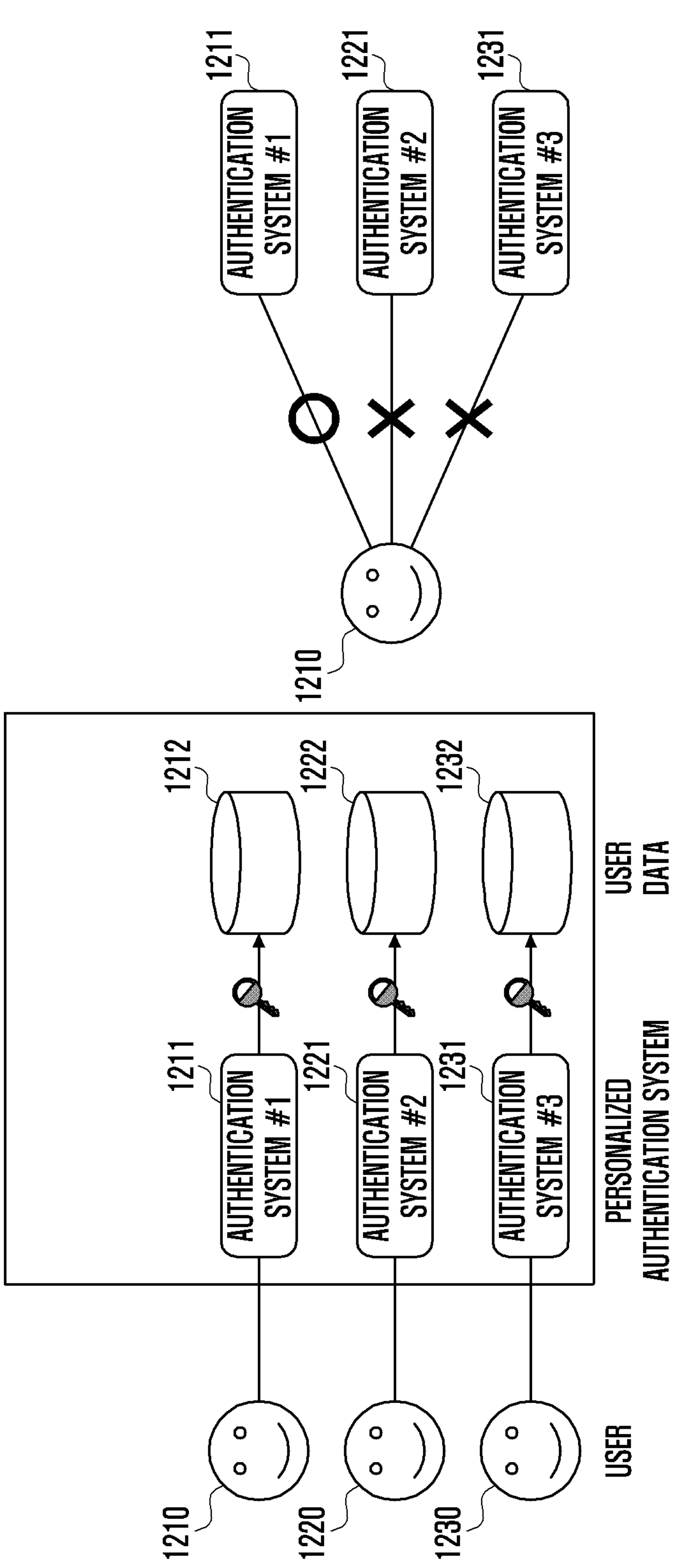
FIG. 12 is a diagram illustrating an electronic device supporting a plurality of users according to an embodiment of the disclosure.

FIG. 12 is a diagram illustrating an electronic device supporting a plurality of users according to an embodiment of the disclosure.

The electronic device 300 may include a plurality of authenticators corresponding to a plurality of users (e.g., a first user 1210, a second user 1220, and a third user 1230). The electronic device 300 may include the fingerprint template database, the fingerprint generation AI model 370, the comparator, and the ASP module 350 for each authenticator. The electronic device 300 may perform the operations described in 3, 4A, 4B, and 5 to 11 for each authenticator. For example, each authenticator may include the fingerprint generation AI model 370 trained according to a corresponding user's fingerprint image, and the ASP module 350. For example, a first authenticator 1211 may perform fingerprint authentication for the first user 1210 based on a first fingerprint template database 1212 corresponding to the first user 1210. For example, a second authenticator 1221 may perform fingerprint authentication for the second user 1220 based on a second fingerprint template database 1222 corresponding to the second user 1220. For example, a third authenticator 1231 may perform fingerprint authentication for the third user 1230 based on a third fingerprint template database 1232 corresponding to the third user 1230.

The electronic device 300 may perform a fingerprint authentication operation for each authenticator in response to a user input attempting fingerprint authentication. The electronic device 300 may identify a user corresponding to an authenticator that succeeded in fingerprint authentication. For example, the first user 1210 may succeed in fingerprint authentication for the first authenticator 1211 and fail in fingerprint authentication for the second authenticator 1221 and the third authenticator 1231. The electronic device 300 may identify a user based on a fingerprint authentication result even when there is no user input specifying the user.

FIG. 13 is a block diagram illustrating an electronic device according to an embodiment of the disclosure.

The electronic device 1300 may include a processor 1310, memory 1320, and a sensor 1330. Even when some of the illustrated components are omitted or replaced with other components, various embodiments of the document may be implemented. In addition to the illustrated components, the electronic device may further include at least some of the components and/or functions of the electronic device 100 of FIG. 1A. At least some of the illustrated (or not illustrated) respective components of the electronic device may be operatively, functionally, and/or electrically connected to each other.

The processor 1310 may include at least one processing circuitry, and the processor 1310 may include at least one processor. The operations described in FIGS. 3, 4A, 4B, and 5 to 12 may be performed individually or collectively by at least one processor 1310 included in the processor 1310. The processor 1310 may perform operations of a comparator (e.g., the comparator 340 of FIG. 3), an ASP module (e.g., the ASP module 350 of FIG. 3 or the ASP module 920 of FIG. 9), a fingerprint authentication unit (e.g., the fingerprint authentication unit 360 of FIG. 3), and/or a fingerprint generation AI model (e.g., the fingerprint generation AI model 370 of FIG. 3, fingerprint generation AI models 615, 616, 625, and 635 of FIG. 6, or the fingerprint generation AI model 720 of FIG. 7), which are included in FIG. 3. The processor 1310 may convert an input fingerprint image (e.g., the input fingerprint image 315 of FIG. 3) acquired by a sensor (e.g., the sensor 310 of FIG. 3) into the input template 325 which is an embedding vector.

The processor 1310 may include a neural processing unit (NPU) (e.g., the NPU 113 of FIG. 1A). The NPU (e.g., the NPU 113 of FIG. 1A) may perform processing optimized for a deep-learning algorithm of AI. According to an embodiment, the NPU (e.g., the NPU 113 of FIG. 1A) is the processor 320 optimized for deep-learning algorithm operations (e.g., AI operations), and process big data quickly and efficiently like a human neural network. For example, the NPU (e.g., the NPU 113 of FIG. 1A) may be mainly used for AI computation. According to an embodiment, the NPU (e.g., the NPU 113 of FIG. 1A) may perform generation of a virtual fingerprint image having structural characteristics similar to an input fingerprint image. According to an embodiment, the NPU (e.g., the NPU 113 of FIG. 1A) may perform processing to generate (e.g., regenerate or reconfigure) an image based on given information (e.g., an image and/or a prompt).

The memory 1320 may store at least one computer program, and the at least one computer program may include instructions that can be executed by the processor 1310. The operation of the processor 1310 described in FIGS. 3, 4A, 4B, and 5 to 12 may be performed according to the execution of the instructions included in the memory 1320. The memory may store the fingerprint template database 330 including the normal state fingerprint template 301, the abnormal state fingerprint template 302, and the forged fingerprint template 303 as shown in FIG. 3. The memory may store an ASP module as shown in FIG. 3 (e.g., the ASP module 350 of FIG. 3 or the ASP module 920 of FIG. 9), and a fingerprint generation AI model (e.g., the fingerprint generation AI model 370 of FIG. 3, the fingerprint generation AI models 615, 616, 625, and 635 of FIG. 6, or the fingerprint generation AI model 720 of FIG. 7).

The sensor 1330 may acquire a fingerprint image of a user in various ways. For example, an optical fingerprint recognition sensor may detect a user's fingerprint by detecting light emitted from a light source. An electrostatic fingerprint recognition sensor may detect a fingerprint by detecting electrostatic capacity formed by a human fingerprint using a semiconductor device sensitive to voltage and current. An ultrasonic fingerprint recognition sensor may detect a user's fingerprint by generating a high-frequency sound wave and measuring the cycle of the sound wave being reflected from the fingerprint and returning.

Figure 14:
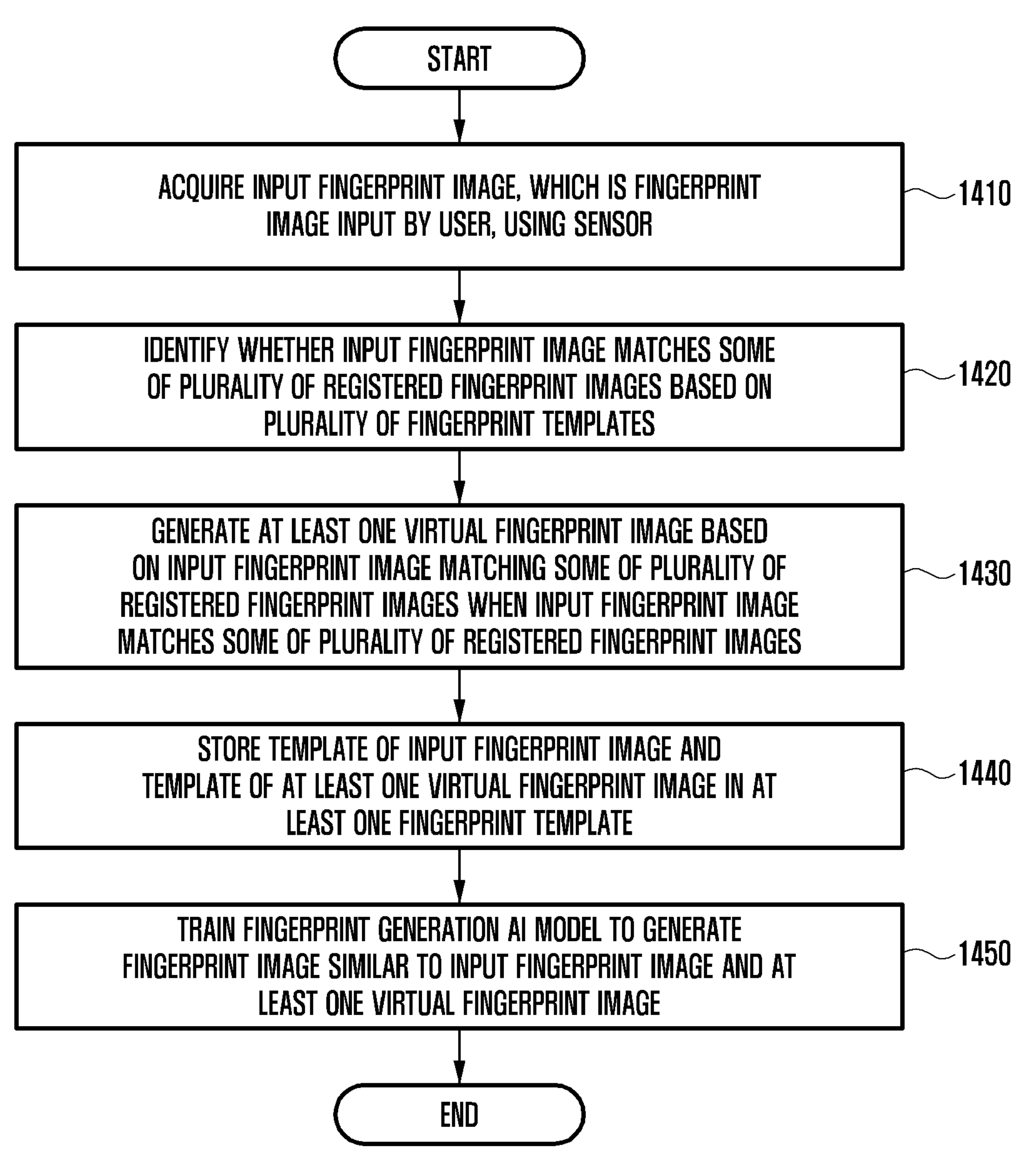
FIG. 14 is a flowchart illustrating operations of an electronic device according to an embodiment of the disclosure.

FIG. 14 is a flowchart illustrating operations of an electronic device according to an embodiment of the disclosure.

According to an embodiment, in operation 1410, the electronic device may acquire an input fingerprint image, which is a fingerprint image input by a user, using a sensor. The input fingerprint image indicates (or corresponds to) the fingerprint image input by a user The electronic device may convert the input fingerprint image 315 into the input fingerprint template 325. The template may refer to text data obtained by extracting characteristic information of the fingerprint image. The template may be provided in a form that can identify the similarity between distinguished fingerprint images. For example, the template may be information obtained by converting an image into the form of an embedding vector.

According to an embodiment, in operation 1420, the electronic device may determine whether the input fingerprint image matches some (or at least a part, at least one) of a plurality of registered fingerprint images based on a plurality of fingerprint templates.

The electronic device may determine whether the input fingerprint image matches some of the plurality of registered fingerprint images based on the plurality of fingerprint templates according to the operational flowchart illustrated in FIG. 4A. The content described in FIG. 4A is omitted in FIG. 14.

According to an embodiment, in operation 1430, when the input fingerprint image matches some of the plurality of registered fingerprint images, the electronic device may generate at least one virtual fingerprint image based on the input fingerprint image that matches some of the plurality of registered fingerprint images.

The electronic device may generate at least one virtual fingerprint image based on the input fingerprint image that matches some of the plurality of registered fingerprint images, when the input fingerprint image matches some of the plurality of registered fingerprint images, according to the content described in FIGS. 5 and 6. The content described in FIGS. 5 and 6 is omitted in FIG. 14.

According to an embodiment, in operation 1440, the electronic device may store the template of the input fingerprint image and the template of the at least one virtual fingerprint image in at least one fingerprint template.

The electronic device may store the input fingerprint image and the at least one virtual fingerprint image in the at least one fingerprint template according to the content described in FIGS. 5 and 6. The content described in FIGS. 5 and 6 is omitted in FIG. 14.

According to an embodiment, in operation 1450, the electronic device may train a fingerprint generation AI model to generate fingerprint images similar to the input fingerprint image and the at least one virtual fingerprint image.

The electronic device may train the fingerprint generation AI model to generate the fingerprint images similar to the input fingerprint image and the at least one virtual fingerprint image, according to the content described in FIG. 6. The content described in FIG. 6 is omitted in FIG. 14.

The fingerprint generation AI model can be an AI model trained based on the input fingerprint image and the virtual fingerprint image according to FIG. 7.

The electronic device may train the ASP module based on the normal state fingerprint template, the abnormal state fingerprint template, and the forged fingerprint template according to FIGS. 8 and 9.

The electronic device may determine the fingerprint authentication result of the input fingerprint image according to FIGS. 10 and 11.

The electronic device may include the plurality of authenticators corresponding to the plurality of users according to FIG. 12.

The registered fingerprint image may be information about the fingerprint image from the past before the time of performing fingerprint authentication. The user's fingerprint may change over time. When the input template 225 of the registered fingerprint image is not updated, the electronic device cannot perform fingerprint authentication by reflecting the changed user fingerprint. The fingerprint authenticator 200 may have a reduced accuracy of fingerprint authentication over time.

In a situation where a user performs fingerprint authentication, there may be an obstacle on the user's fingerprint. The input fingerprint image 215 may be acquired unclearly depending on the obstacle. The user should input a fingerprint without an obstacle to succeed in fingerprint authentication, and a problem may occur where the success rate of fingerprint authentication varies depending on the obstacle present in the fingerprint each time fingerprint authentication is performed.

The ASP module (e.g., the ASP module 250 of FIG. 2) may be a model that determines whether an unspecified fingerprint image is forged. Since the ASP module (e.g., the ASP module 350 of FIG. 3) determines whether the input fingerprint image (e.g., the input fingerprint image 215 of FIG. 2) is forged without reflecting the characteristics of the user's fingerprint image, the ASP module (e.g., the ASP module 350 of FIG. 3) may incorrectly determine whether some of the user's fingerprint images are forged and determine them as forged fingerprint images. The ASP module (e.g., the ASP module 250 of FIG. 2) may determine the fingerprint authentication result as failed by determining the fingerprint image as a forged fingerprint image even when the user inputs the fingerprint image normally.

The technical problems to be achieved in this document are not limited to the technical problems mentioned above, and other technical problems not mentioned can be clearly understood by a person having ordinary skill in the technical field to which the disclosure belongs from the description below.

An electronic device (e.g., the electronic device 100 of FIG. 1A or the electronic device 300 of FIG. 3) according to an embodiment may include a sensor (e.g., the sensor 310 of FIG. 3 or the sensor 1330 of FIG. 13). The electronic device (e.g., the electronic device 100 of FIG. 1A or the electronic device 300 of FIG. 3) may include memory (e.g., the memory 1320 of FIG. 13) that stores at least one computer program including instructions and a plurality of fingerprint templates corresponding to each of a plurality of registered fingerprint images. The electronic device (e.g., the electronic device 100 of FIG. 1A or the electronic device 300 of FIG. 3) may include at least one processor (e.g., the processor 1310 of FIG. 13). The plurality of registered fingerprint images may include a forged fingerprint image (e.g., the forged fingerprint image 403 of FIG. 4B) made by forging a user's fingerprint, an abnormal state image (e.g., the abnormal state fingerprint image 402 of FIG. 4B) that includes an obstacle obstructing fingerprint authentication among the user's fingerprints, and a normal state image (e.g., the normal state fingerprint image 401 of FIG. 4B) that does not include an obstacle among the user's fingerprints. The instructions, when executed individually or collectively by the at least one processor (e.g., the processor 1310 of FIG. 13), may cause the electronic device (e.g., the electronic device 100 of FIG. 1A or the electronic device 300 of FIG. 3) to acquire an input fingerprint image (e.g., the input fingerprint image 315 of FIG. 3), which is a fingerprint image input by a user, by using a sensor (e.g., the sensor 310 of FIG. 3 or the sensor 1330 of FIG. 13). The instructions may include instructions for identifying whether the input fingerprint image (e.g., the input fingerprint image 315 of FIG. 3) matches some of the plurality of registered fingerprint images based on the plurality of fingerprint templates. When the input fingerprint image (e.g., the input fingerprint image 315 of FIG. 3) matches some of the plurality of registered fingerprint images, the instructions may include instructions that generate at least one virtual fingerprint image (e.g., the virtual abnormal state fingerprint image 412 of FIG. 6, the virtual abnormal state fingerprint image 422, the virtual forged fingerprint image 413, the virtual forged fingerprint image 433, or the virtual fingerprint image 740 of FIG. 7) based on the input fingerprint image (e.g., the input fingerprint image 315 of FIG. 3) that matches some of the plurality of fingerprint images. The instructions may include instructions that store the templates of the input fingerprint image (e.g., the input fingerprint image 315 of FIG. 3) and the at least one virtual fingerprint image (e.g., the virtual abnormal state fingerprint image 412 of FIG. 6, the virtual abnormal state fingerprint image 422, the virtual forged fingerprint image 413, the virtual forged fingerprint image 433, or the virtual fingerprint image 740 of FIG. 7) in the plurality of fingerprint templates. The instructions may include instructions that train the fingerprint generation AI model (e.g., the fingerprint generation AI model 370 of FIG. 3, the fingerprint generation AI models 615, 616, 625, and 635 of FIG. 6, or the fingerprint generation AI model 720 of FIG. 7) based on the input fingerprint image (e.g., the input fingerprint image 315 of FIG. 3) and the at least one virtual fingerprint image (e.g., the virtual abnormal state fingerprint image 412 of FIG. 6, the virtual abnormal state fingerprint image 422, the virtual forged fingerprint image 413 of FIG. 6, or the virtual forged fingerprint image 433 of FIG. 7).

The electronic device (e.g., the electronic device 100 of FIG. 1A or the electronic device 300 of FIG. 3) may perform fingerprint authentication based on the results of comparing the input fingerprint image (e.g., the input fingerprint image 315 of FIG. 3) with each of the abnormal state fingerprint image (e.g., the abnormal state fingerprint image 402 of FIG. 4B), the normal state fingerprint image, and/or the forged fingerprint image (e.g., the forged fingerprint image 403 of FIG. 4B). The electronic device (e.g., the electronic device 100 of FIG. 1A or the electronic device 300 of FIG. 3) may accurately acquire the fingerprint authentication result by comparing the abnormal state fingerprint image with the input fingerprint, even when the input fingerprint image (e.g., the input fingerprint image 315 of FIG. 3) is a fingerprint image acquired with an obstacle or a forged fingerprint image.

In the electronic device (e.g., the electronic device 100 of FIG. 1A or the electronic device 300 of FIG. 3) according to an embodiment, the instructions, when individually or collectively executed by at least one processor (e.g., the processor 1310 of FIG. 13), may cause the electronic device (e.g., the electronic device 100 of FIG. 1A or the electronic device 300 of FIG. 3) to train an ASP module (e.g., the ASP module 350 of FIG. 3 or the ASP module 920 of FIG. 9) that determines whether the input fingerprint image (e.g., the input fingerprint image 315 of FIG. 3) is forged based on the input fingerprint image (e.g., the input fingerprint image 315 of FIG. 3) that matches some of the plurality of registered fingerprint images and the at least one virtual fingerprint image (e.g., the virtual abnormal state fingerprint image 412 of FIG. 6, the virtual abnormal state fingerprint image 422, the virtual forged fingerprint image 413, the virtual forged fingerprint image 433, or the virtual fingerprint image 740 of FIG. 7).

In the electronic device (e.g., the electronic device 100 of FIG. 1A or the electronic device 300 of FIG. 3) according to an embodiment, the instructions, when individually or collectively executed by the at least one processor (e.g., the processor 1310 of FIG. 13), may cause the electronic device (e.g., the electronic device 100 of FIG. 1A or the electronic device 300 of FIG. 3) to determine whether the input fingerprint image (e.g., the input fingerprint image 315 of FIG. 3) that matches some of the plurality of registered fingerprint images is forged, by using the anti-spoofing-protection (ASP) module. The instructions, when individually or collectively executed by the at least one processor (e.g., the processor 1310 of FIG. 13), may cause the electronic device (e.g., the electronic device 100 of FIG. 1A or the electronic device 300 of FIG. 3) to determine fingerprint authentication as failed when the input fingerprint image (e.g., the input fingerprint image 315 of FIG. 3) that matches some of the plurality of fingerprint images is a forged fingerprint image (e.g., the forged fingerprint image 403 of FIG. 4B). The instructions, when individually or collectively executed by the at least one processor (e.g., the processor 1310 of FIG. 13), may cause the electronic device (e.g., the electronic device 100 of FIG. 1A or the electronic device 300 of FIG. 3) to determine fingerprint authentication as successful when the input fingerprint image (e.g., the input fingerprint image 315 of FIG. 3) that matches some of the plurality of registered fingerprint images is determined as a non-forged fingerprint image.

The electronic device (e.g., the electronic device 100 of FIG. 1A or the electronic device 300 of FIG. 3) may be trained to determine whether a fingerprint image is forged based on a user's fingerprint image. Since the electronic device (e.g., the electronic device 100 of FIG. 1A or the electronic device 300 of FIG. 3) can generate a large number of virtual fingerprint images (e.g., the virtual abnormal state fingerprint image 412 of FIG. 6, the virtual abnormal state fingerprint image 422, the virtual forged fingerprint image 413, the virtual forged fingerprint image 433, or the virtual fingerprint image 740 of FIG. 7) based on the input fingerprint image (e.g., the input fingerprint image 315 of FIG. 3), the electronic device (e.g., the electronic device 100 of FIG. 1A or the electronic device 300 of FIG. 3) may acquire a large number of user's fingerprint images for training an ASP module (e.g., the ASP module 350 of FIG. 3 or the ASP module 920 of FIG. 9). The ASP module (e.g., the ASP module 350 of FIG. 3 or ASP module 920 of FIG. 9) trained based on the large number of user's fingerprint images may increase the accuracy of determining whether the user's fingerprint image is forged.

In the electronic device (e.g., the electronic device 100 of FIG. 1A or the electronic device 300 of FIG. 3) according to an embodiment, the instructions, when individually or collectively executed by the at least one processor (e.g., the processor 1310 of FIG. 13), may cause the electronic device (e.g., the electronic device 100 of FIG. 1A or the electronic device 300 of FIG. 3) to acquire a plurality of comparison values by comparing the plurality of fingerprint templates (e.g., the normal state fingerprint template 301 of FIG. 3, the abnormal state fingerprint template 302 of FIG. 3, or the forged fingerprint template 303 of FIG. 3) and the template of the input fingerprint image (e.g., the input fingerprint image 315 of FIG. 3). The instructions, when individually or collectively executed by the at least one processor (e.g., the processor 1310 of FIG. 13), may cause the electronic device (e.g., the electronic device 100 of FIG. 1A or the electronic device 300 of FIG. 3) to determine whether the input fingerprint image (e.g., the input fingerprint image 315 of FIG. 3) matches some of the plurality of registered fingerprint images based on results obtained by comparing the plurality of comparison values with a threshold value.

In the electronic device (e.g., the electronic device 100 of FIG. 1A or the electronic device 300 of FIG. 3) according to an embodiment, the instructions, when individually or collectively executed by the at least one processor (e.g., the processor 1310 of FIG. 13), may cause the electronic device (e.g., the electronic device 100 of FIG. 1A or the electronic device 300 of FIG. 3) to classify the input fingerprint image (e.g., the input fingerprint image 315 of FIG. 3) that matches some of the plurality of registered fingerprint images into one fingerprint image of the forged fingerprint image (e.g., the forged fingerprint image 403 of FIG. 4B, the abnormal state image (e.g., the abnormal state fingerprint image 402 of FIG. 4B), and the normal state image (e.g., the normal state fingerprint image 401 of FIG. 4B), based on the plurality of comparison values.

In the electronic device (e.g., the electronic device 100 of FIG. 1A or the electronic device 300 of FIG. 3) according to an embodiment, the instructions, when individually or collectively executed by the at least one processor (e.g., the processor 1310 of FIG. 13), may cause the electronic device (e.g., the electronic device 100 of FIG. 1A or the electronic device 300 of FIG. 3) to generate a virtual fingerprint image (e.g., the virtual abnormal state fingerprint image 412 of FIG. 6, the virtual abnormal state fingerprint image 422, the virtual forged fingerprint image 413, the virtual forged fingerprint image 433, or the virtual fingerprint image 740 of FIG. 7) corresponding to the classified input fingerprint image (e.g., the input fingerprint image 315 of FIG. 3) based on the classified input fingerprint image (e.g., the input fingerprint image 315 of FIG. 3). The instructions, when individually or collectively executed by the at least one processor (e.g., the processor 1310 of FIG. 13), may cause the electronic device (e.g., the electronic device 100 of FIG. 1A or the electronic device 300 of FIG. 3) to store the template of the generated virtual fingerprint image (e.g., the virtual abnormal state fingerprint image 412 of FIG. 6, the virtual abnormal state fingerprint image 422, the virtual forged fingerprint image 413, the virtual forged fingerprint image 433, or the virtual fingerprint image 740 of FIG. 7) as a template corresponding to the template of the forged fingerprint image (e.g., the forged fingerprint image of FIG. 4B), the template of the abnormal state image (e.g., the abnormal state fingerprint image 402 of FIG. 4B), and the template of the normal state fingerprint image (e.g., the normal state fingerprint image 401 of FIG. 4B).

The electronic device (e.g., the electronic device 100 of FIG. 1A or the electronic device 300 of FIG. 3) may perform fingerprint authentication based on an input fingerprint image (e.g., the input fingerprint image 315 of FIG. 3) as well as a registered fingerprint image by storing an input template in a fingerprint template database (e.g., the fingerprint template database 330 of FIG. 3). Since the electronic device (e.g., the electronic device 100 of FIG. 1A or the electronic device 300 of FIG. 3) performs fingerprint authentication based on a recently input user's fingerprint image, accurate fingerprint authentication can be performed even when the user's fingerprint changes over time. In addition, the electronic device (e.g., the electronic device 100 of FIG. 1A or the electronic device 300 of FIG. 3) may generate a virtual fingerprint image (e.g., the virtual abnormal state fingerprint image 412 of FIG. 6, the virtual abnormal state fingerprint image 422, the virtual forged fingerprint image 413, the virtual forged fingerprint image 433, or the virtual fingerprint image 740 of FIG. 7) in which the structural characteristics of the input fingerprint image (e.g., the input fingerprint image 315 of FIG. 3) are maintained, and perform fingerprint authentication based on the template of the virtual fingerprint image (e.g., the virtual abnormal state fingerprint image 412 of FIG. 6, the virtual abnormal state fingerprint image 422, the virtual forged fingerprint image 413, the virtual forged fingerprint image 433, or the virtual fingerprint image 740 of FIG. 7). Since a limited number of fingerprint images can be compared with the input fingerprint image (e.g., the input fingerprint image 315 of FIG. 3), the electronic device (e.g., the electronic device 100 of FIG. 1A or the electronic device 300 of FIG. 3) can perform accurate fingerprint authentication.

In the electronic device (e.g., the electronic device 100 of FIG. 1A or the electronic device 300 of FIG. 3) according to an embodiment, the abnormal state image (e.g., the abnormal state fingerprint image 402 of FIG. 4B) may include a wet state fingerprint image and a dry state fingerprint image.

In the electronic device (e.g., the electronic device 100 of FIG. 1A or the electronic device 300 of FIG. 3) according to an embodiment, the instructions, when individually or collectively executed by the at least one processor (e.g., the processor 1310 of FIG. 13), may cause the electronic device (e.g., the electronic device 100 of FIG. 1A or the electronic device 300 of FIG. 3) to determine fingerprint authentication of the input fingerprint image (e.g., the input fingerprint image 315 of FIG. 3) as failed when the input fingerprint image (e.g., the input fingerprint image 315 of FIG. 3) does not match some of the plurality of registered fingerprint images.

In the electronic device (e.g., the electronic device 100 of FIG. 1A or the electronic device 300 of FIG. 3) according to an embodiment, the processor (e.g., the processor 1310 of FIG. 13) may include at least one neural processing unit (NPU) (e.g., the NPU 113 of FIG. 1A). In the electronic device (e.g., the electronic device 100 of FIG. 1A or the electronic device 300 of FIG. 3) according to an embodiment, the instructions, when individually or collectively executed by the at least one processor (e.g., the processor 1310 of FIG. 13), may cause the electronic device (e.g., the electronic device 100 of FIG. 1A or the electronic device 300 of FIG. 3) to generate the at least one virtual fingerprint image (e.g., the virtual abnormal state fingerprint image 412 of FIG. 6, the virtual abnormal state fingerprint image 422, the virtual forged fingerprint image 413, the virtual forged fingerprint image 433, or the virtual fingerprint image 740 of FIG. 7) by using the at least one NPU (e.g., the NPU 113 of FIG. 1A).

In the electronic device (e.g., the electronic device 100 of FIG. 1A or the electronic device 300 of FIG. 3) according to an embodiment, the memory (e.g., memory 1320 of FIG. 13) may store templates corresponding to each of a plurality of users (e.g., the first user 1210, the second user 1220, and third user 1230 of FIG. 12). The instructions, when individually or collectively executed by the at least one processor (e.g., the processor 1310 of FIG. 13), may cause the electronic device (e.g., the electronic device 100 of FIG. 1A or the electronic device 300 of FIG. 3) to specify the user of the input fingerprint image (e.g., the input fingerprint image 315 of FIG. 3) based on the templates corresponding to the plurality of users (e.g., the first user 1210, the second user 1220, and third user 1230 of FIG. 12).

An operating method of an electronic device (e.g., the electronic device 100 of FIG. 1A or the electronic device 300 of FIG. 3) may include acquiring an input fingerprint image (e.g., the input fingerprint image 315 of FIG. 3), which is a fingerprint image input by a user, using a sensor (e.g., the sensor 310 of FIG. 3 or the sensor 1330 of FIG. 13). The operating method of the electronic device (e.g., the electronic device 100 of FIG. 1A or the electronic device 300 of FIG. 3) may include identifying whether the input fingerprint image (e.g., the input fingerprint image 315 of FIG. 3) matches some of the plurality of registered fingerprint images based on a plurality of fingerprint templates (e.g., the normal state fingerprint template 301 of FIG. 3, the abnormal state fingerprint template 302 of FIG. 3, or the forged fingerprint template 303 of FIG. 3) corresponding to each of the plurality of registered fingerprint images. The operating method of the electronic device (e.g., the electronic device 100 of FIG. 1A or the electronic device 300 of FIG. 3) may include generating at least one virtual fingerprint image (e.g., the virtual abnormal state fingerprint image 412 of FIG. 6, the virtual abnormal state fingerprint image 422, the virtual forged fingerprint image 413, the virtual forged fingerprint image 433, or the virtual fingerprint image 740 of FIG. 7) based on the input fingerprint image (e.g., the input fingerprint image 315 of FIG. 3) that matches some of the plurality of fingerprint images, when the input fingerprint image (e.g., the input fingerprint image 315 of FIG. 3) matches some of the plurality of registered fingerprint images. The operating method of the electronic device (e.g., the electronic device 100 of FIG. 1A or the electronic device 300 of FIG. 3) may include storing the template of the input fingerprint image (e.g., the input fingerprint image 315 of FIG. 3) and the template of the at least one virtual fingerprint image (e.g., the virtual abnormal state fingerprint image 412 of FIG. 6, the virtual abnormal state fingerprint image 422, the virtual forged fingerprint image 413, the virtual forged fingerprint image 433, or the virtual fingerprint image 740 of FIG. 7) in the plurality of fingerprint templates (e.g., the normal state fingerprint template 301 of FIG. 3, the abnormal state fingerprint template 302 of FIG. 3, and the forged fingerprint template 303 of FIG. 3).

The operating method of the electronic device (e.g., the electronic device 100 of FIG. 1A or the electronic device 300 of FIG. 3) may include training a fingerprint generation AI model (e.g., the fingerprint generation AI model 370 of FIG. 3, the fingerprint generation AI models 615, 616, 625, and 635 of FIG. 6, or the fingerprint generation AI model 720 of FIG. 7) based on the input fingerprint image (e.g., the input fingerprint image 315 of FIG. 3) and the at least one virtual fingerprint image (e.g., the virtual abnormal state fingerprint image 412 of FIG. 6, the virtual abnormal state fingerprint image 422, the virtual forged fingerprint image 413, the virtual forged fingerprint image 433, or the virtual fingerprint image 740 of FIG. 7). The operating method of the electronic device (e.g., the electronic device 100 of FIG. 1A or the electronic device 300 of FIG. 3) may include training an ASP module (e.g., the ASP module 350 of FIG. 3 or the ASP module 920 of FIG. 9) to determine whether the input fingerprint image (e.g., the input fingerprint image 315 of FIG. 3) is forged based on the input fingerprint image (e.g., the input fingerprint image 315 of FIG. 3) that matches some of the plurality of registered fingerprint images and the at least one virtual fingerprint image (e.g., the virtual abnormal state fingerprint image 412 of FIG. 6, the virtual abnormal state fingerprint image 422, the virtual forged fingerprint image 413, the virtual forged fingerprint image 433, or the virtual fingerprint image 740 of FIG. 7).

The operating method of the electronic device (e.g., the electronic device 100 of FIG. 1A or the electronic device 300 of FIG. 3) according to an embodiment may include determining whether the input fingerprint image (e.g., the input fingerprint image 315 of FIG. 3) that matches some of the plurality of registered fingerprint images is forged, by using the ASP module. When the input fingerprint image (e.g., the input fingerprint image 315 of FIG. 3) that matches some of the plurality of registered fingerprint images is determined as a forged fingerprint image (e.g., the forged fingerprint image 403 of FIG. 4B), the operating method of the electronic device (e.g., the electronic device 100 of FIG. 1A or the electronic device 300 of FIG. 3) may include determining fingerprint authentication as failed. When the input fingerprint image (e.g., the input fingerprint image 315 of FIG. 3) that matches some of the plurality of registered fingerprint images is determined as a non-forged fingerprint image, the operating method of the electronic device (e.g., the electronic device 100 of FIG. 1A or the electronic device 300 of FIG. 3) may include determining fingerprint authentication as successful.

The operating method of the electronic device (e.g., the electronic device 100 of FIG. 1A or the electronic device 300 of FIG. 3) according to an embodiment may include acquiring a plurality of comparison values by comparing the plurality of fingerprint templates (e.g., the normal state fingerprint template 301 of FIG. 3, the abnormal state fingerprint template 302 of FIG. 3, and the forged fingerprint template 303 of FIG. 3) with the template of the input fingerprint image (e.g., the input fingerprint image 315 of FIG. 3). The operating method of the electronic device (e.g., the electronic device 100 of FIG. 1A or the electronic device 300 of FIG. 3) may include identifying whether the input fingerprint image (e.g., the input fingerprint image 315 of FIG. 3) matches some of the plurality of registered fingerprint images based on a result obtained by comparing the plurality of comparison values and a threshold value.

The operating method of the electronic device (e.g., the electronic device 100 of FIG. 1A or the electronic device 300 of FIG. 3) according to an embodiment may include classifying the input fingerprint image (e.g., the input fingerprint image 315 of FIG. 3) that matches some of the plurality of registered fingerprint images into one fingerprint image of a forged fingerprint image (e.g., the forged fingerprint image 403 of FIG. 4B) made by forging the user's fingerprint, an abnormal state image (e.g., the abnormal state fingerprint image 402 of FIG. 4B) including an obstacle obstructing fingerprint authentication among the user's fingerprints, and a normal state image (e.g., the normal state fingerprint image 401 of FIG. 4B) not including the obstacle among the user's fingerprints, based on the plurality of comparison values.

The operating method of the electronic device (e.g., the electronic device 100 of FIG. 1A or the electronic device 300 of FIG. 3) according to an embodiment may include generating a virtual fingerprint image (e.g., (e.g., the virtual abnormal state fingerprint image 412 of FIG. 6, the virtual abnormal state fingerprint image 422, the virtual forged fingerprint image 413, the virtual forged fingerprint image 433, or the virtual fingerprint image 740 of FIG. 7) corresponding to the classified input fingerprint image (e.g., the input fingerprint image 315 of FIG. 3) based on the classified input fingerprint image (e.g., the input fingerprint image 315 of FIG. 3). The operating method of the electronic device (e.g., the electronic device 100 of FIG. 1A or the electronic device 300 of FIG. 3) may include storing the template of the generated virtual fingerprint image (e.g., the virtual abnormal state fingerprint image 412 of FIG. 6, the virtual abnormal state fingerprint image 422, the virtual forged fingerprint image 413, the virtual forged fingerprint image 433, or the virtual fingerprint image 740 of FIG. 7) as a corresponding template of a template of a forged fingerprint image (e.g., the template of the forged fingerprint image 403 of FIG. 4B), a template of an abnormal state image (e.g., the abnormal state fingerprint image 402 of FIG. 4B), and a template of a normal state image (e.g. the normal state fingerprint image 401 of FIG. 4B).

In the operating method of the electronic device (e.g., the electronic device 100 of FIG. 1A or the electronic device 300 of FIG. 3) according to an embodiment, the abnormal state image (the abnormal state fingerprint image 402 of FIG. 4B) may be a fingerprint image including a wet fingerprint image and a dry fingerprint image.

The operating method of the electronic device (e.g., the electronic device 100 of FIG. 1A or the electronic device 300 of FIG. 3) according to an embodiment may include determining fingerprint authentication of the input fingerprint image (e.g., the input fingerprint image 315 of FIG. 3) as failed when the input fingerprint image (e.g., the input fingerprint image 315 of FIG. 3) does not match some of the plurality of registered fingerprint images.

The operating method of the electronic device (e.g., the electronic device 100 of FIG. 1A or the electronic device 300 of FIG. 3) according to an embodiment may include generating the at least one virtual fingerprint image (e.g., the virtual abnormal state fingerprint image 412 of FIG. 6, the virtual abnormal state fingerprint image 422, the virtual forged fingerprint image 413, the virtual forged fingerprint image 433, or the virtual fingerprint image 740 of FIG. 7) by using at least one NPU (e.g., the NPU 113 of FIG. 1A).

The operating method of the electronic device (e.g., the electronic device 100 of FIG. 1A or the electronic device 300 of FIG. 3) according to an embodiment may include specifying a user of the input fingerprint image (e.g., the input fingerprint image 315 of FIG. 3) based on the templates corresponding to a plurality of users (e.g., the first user 1210, the second user 1220, and third user 1230 of FIG. 12).

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that the embodiments and the terms used therein are not intended to limit the technological features set forth herein to particular embodiments and the disclosure includes various changes, equivalents, or alternatives for a corresponding embodiment. With regard to the description of the drawings, similar reference numerals may be used to designate similar or relevant elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). If an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

As used in various embodiments of the disclosure, the term "module" may include a unit implemented in hardware, software, or firmware, and may be interchangeably used with other terms, for example, "logic," "logic block," "component," or "circuit". The "module" may be a single integrated component, or a minimum unit or part thereof, adapted to perform one or more functions. For example, according to an embodiment, the "module" may be implemented in the form of an application-specific integrated circuit (ASIC).

Various embodiments of the disclosure may be implemented as software (e.g., the program) including one or more instructions that are stored in a storage medium (e.g., internal memory or external memory) that is readable by a machine (e.g., the electronic device 100). For example, a processor (e.g., the processor 110) of the machine (e.g., the electronic device 100) may invoke at least one of the one or more instructions stored in the storage medium, and execute it. This allows the machine to be operated to perform at least one function according to the at least one instruction invoked. The one or more instructions each may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, methods according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., module or program) of the above-described elements may include a single entity or multiple entities, and some of the multiple entities may be separately disposed in another element. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device individually or collectively, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a sensor;

memory configured to store a plurality of registered fingerprint templates, each of the plurality of registered fingerprint templates comprising at least one embedding vector indicating a respective one of a plurality of registered fingerprint images, and at least one computer program; and at least one processor communicatively coupled to the sensor and the memory, wherein the plurality of registered fingerprint images comprises a forged fingerprint image made by forging a fingerprint of a user, an abnormal state fingerprint image comprising an obstacle obstructing fingerprint authentication, and a normal state fingerprint image which is either a successfully registered fingerprint image or a fingerprint image matching the successfully registered fingerprint image, and wherein the at least one computer program comprises instructions that, when executed by the at least one processor individually or collectively, cause the electronic device to:

acquire, using the sensor, an input fingerprint image indicating a fingerprint image input by the user, generate an input fingerprint template from the input fingerprint image, compare the input fingerprint template and the plurality of registered fingerprint templates, identify whether the input fingerprint template matches at least a part of the plurality of registered fingerprint templates, based on the comparison, in case that the input fingerprint template matches the at least a part of the plurality of registered fingerprint templates, generate, using a fingerprint generation artificial intelligence model, at least one virtual fingerprint image representing a fingerprint of the user in at least one of an abnormal state or a forged state, based on the input fingerprint image, generate at least one virtual fingerprint template from the at least one virtual fingerprint image, store the input fingerprint template and the at least one virtual fingerprint template in the memory, and train the fingerprint generation artificial intelligence model based on the input fingerprint image.

2. The electronic device of claim 1, wherein the instructions further comprise an instruction that, when executed by the at least one processor individually or collectively, cause the electronic device to train an anti-spoofing-protection (ASP) circuitry configured to determine whether the input fingerprint image is a forged image, based on the input fingerprint image matching the at least a part of the plurality of registered fingerprint images and the at least one virtual fingerprint image.

3. The electronic device of claim 2, wherein the instructions further comprise instructions that, when executed by the at least one processor individually or collectively, cause the electronic device to:

use the ASP circuitry to determine whether the input fingerprint image matching the at least a part of the plurality of registered fingerprint images is a forged fingerprint image;

in case of determining that the input fingerprint image matching the at least a part of the plurality of registered fingerprint images is a forged fingerprint image, determine that fingerprint authentication has failed; and in case of determining that the input fingerprint image matching the at least a part of the plurality of registered fingerprint images is not a forged fingerprint image, determine that fingerprint authentication has succeeded.

4. The electronic device of claim 1, wherein the instructions further comprise an instruction that, when executed by the at least one processor individually or collectively, cause the electronic device to based on a plurality of comparison values, classify the input fingerprint image matching the at least a part of the plurality of registered fingerprint images as one of the forged fingerprint image, the abnormal state fingerprint image, or the normal state fingerprint image.

5. The electronic device of claim 4, wherein the instructions further comprise instructions that, when executed by the at least one processor individually or collectively, cause the electronic device to:

based on the classified input fingerprint image, generate a virtual fingerprint image corresponding to the classified input fingerprint image; and store a template of the generated virtual fingerprint image as a corresponding template among a template of the forged fingerprint image, a template of the abnormal state fingerprint image, and a template of the normal state fingerprint image.

6. The electronic device of claim 5, wherein the instructions further comprise instructions that, when executed by the at least one processor individually or collectively, cause the electronic device to generate the at least one virtual fingerprint image corresponding to the input fingerprint image in the case that the input fingerprint image is clearly acquired and has recognizable structural characteristics, and wherein a template of the input fingerprint image and a template of the at least one virtual fingerprint image are stored in the plurality of registered fingerprint templates.

7. The electronic device of claim 6, wherein the instructions further comprise instructions that, when executed by the at least one processor individually or collectively, cause the electronic device to:

receive another input fingerprint image for authentication; and in response to receiving the other input fingerprint image for authentication, determine whether the other input fingerprint image matches at least a part of the plurality of registered fingerprint images including the input fingerprint image and the at least one virtual fingerprint image.

8. The electronic device of claim 4, wherein the abnormal state fingerprint image comprises a fingerprint image in a wet state or a fingerprint image in a dry state.

9. The electronic device of claim 1, wherein the instructions further comprise an instruction that, when executed by the at least one processor individually or collectively, cause the electronic device to, in case that the input fingerprint image does not match the at least a part of the plurality of registered fingerprint images, determine that fingerprint authentication of the input fingerprint image has failed.

10. The electronic device of claim 1, wherein the processor comprises at least one neural processing unit (NPU), and wherein the processor is configured to generate the at least one virtual fingerprint image by using the at least one NPU.

11. The electronic device of claim 1, wherein the memory is configured to store templates corresponding to multiple users, and wherein the instructions further comprise instructions that, when executed by the at least one processor individually or collectively, cause the electronic device to:

acquire an input fingerprint image by using the sensor, and specify a user of the input fingerprint image, based on the templates corresponding to the multiple users.

12. A method performed by an electronic device, the method comprising:

acquiring, using a sensor, an input fingerprint image corresponding to a fingerprint image input by a user;

generating an input fingerprint template from the input fingerprint image;

comparing the input fingerprint template and a plurality of registered fingerprint templates;

identifying whether the input fingerprint template matches at least a part of the plurality of registered fingerprint templates, based on a result obtained by comparing a plurality of comparison values and a threshold value, wherein each of the plurality of registered fingerprint templates comprises at least one embedding vector indicating a respective one of a plurality of registered fingerprint images, wherein the plurality of registered fingerprint images comprises a forged fingerprint image made by forging a fingerprint of the user, an abnormal state fingerprint image comprising an obstacle obstructing fingerprint authentication, and a normal state fingerprint image which is either a successfully registered fingerprint image or a fingerprint image matching the successfully registered fingerprint image;

in case that the input fingerprint template matches the at least a part of the plurality of registered fingerprint templates, generating, using a fingerprint generation artificial intelligence model, at least one virtual fingerprint image representing a fingerprint of the user in at least one of an abnormal state or a forged state, based on the input fingerprint image;

generating at least one virtual fingerprint template from the at least one virtual fingerprint image;

storing the input fingerprint template and the at least one virtual fingerprint template in memory; and training the fingerprint generation artificial intelligence model based on the input fingerprint image.

13. The method of claim 12, the method further comprising:

training an anti-spoofing-protection (ASP) circuitry configured to determine whether the input fingerprint image is a forged image, based on the input fingerprint image matching the at least a part of the plurality of registered fingerprint images and the at least one virtual fingerprint image.

14. The method of claim 13, the method further comprising:

using the anti-spoofing-protection (ASP) circuitry to determine whether the input fingerprint image matching the at least a part of the plurality of registered fingerprint images is a forged fingerprint image;

in case of determining that the input fingerprint image matching the at least a part of the plurality of registered fingerprint images is a forged fingerprint image, determining that fingerprint authentication has failed; and in case of determining that the input fingerprint image matching the at least a part of the plurality of registered fingerprint images is not a forged fingerprint image, determining that fingerprint authentication has succeeded.

15. The method of claim 12, the method further comprising:

classifying the input fingerprint image matching the at least a part of the plurality of registered fingerprint images as one of a forged fingerprint image, an abnormal state fingerprint image, or a normal state fingerprint image.

16. The method of claim 15, the method further comprising:

based on the classified input fingerprint image, generating a virtual fingerprint image corresponding to the classified input fingerprint image; and storing a template of the generated virtual fingerprint image as a corresponding template among a template of the forged fingerprint image, a template of the abnormal state fingerprint image, and a template of the normal state fingerprint image.

17. The method of claim 16, generate the at least one virtual fingerprint image corresponding to the input fingerprint image in the case that the input fingerprint image is clearly acquired and has recognizable structural characteristics, and wherein a template of the input fingerprint image and a template of the at least one virtual fingerprint image are stored in the plurality of registered fingerprint templates.

18. The method of claim 17, the method further comprising:

receiving another input fingerprint image for authentication; and in response to receiving the other input fingerprint image for authentication, determining whether the other input fingerprint image matches at least a part of the plurality of registered fingerprint images the input fingerprint image and the at least one virtual fingerprint image.

* * * * *